(12) United States Patent
Muroi et al.

(10) Patent No.: US 6,814,875 B2
(45) Date of Patent: Nov. 9, 2004

(54) METHOD AND DEVICE FOR TREATING WASTE LIQUID, SOLVENT SEPARATOR, AND CLEANING DEVICE USING THEREOF

(75) Inventors: Kunimasa Muroi, Shizuoka-ken (JP); Yoichi Nagasaki, Shizuoka-ken (JP); Akira Ohsawa, Shizuoka-ken (JP); Go Ito, Shizuoka-ken (JP); Jun Yamamoto, Shizuoka-ken (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/969,978

(22) Filed: Oct. 2, 2001

(65) Prior Publication Data

US 2002/0060186 A1 May 23, 2002

(30) Foreign Application Priority Data

Oct. 6, 2000 (JP) .................................. 2000-308380
Oct. 10, 2000 (JP) .................................. 2000-309871

(51) Int. Cl.$^7$ .................................. C02F 14/04
(52) U.S. Cl. .................. 210/748; 210/806; 210/167; 210/188; 210/295; 210/908
(58) Field of Search ................. 210/748, 806, 210/167, 188, 295, 908

(56) References Cited

U.S. PATENT DOCUMENTS

| | | | | |
|---|---|---|---|---|
| 4,086,705 | A | * | 5/1978 | Wehr |
| 4,663,222 | A | | 5/1987 | Ohue et al. |
| 4,850,498 | A | | 7/1989 | Taylor |
| 5,102,503 | A | * | 4/1992 | Silinski et al. |
| 5,431,827 | A | * | 7/1995 | Tatch |
| 5,711,873 | A | * | 1/1998 | Rewitzer et al. |
| 6,086,635 | A | * | 7/2000 | Berndt et al. |

FOREIGN PATENT DOCUMENTS

| | | |
|---|---|---|
| EP | 0255747 A1 | 8/1987 |
| JP | 51-92785 | 8/1976 |
| JP | 62-191095 | 8/1987 |
| JP | 63-119807 | 5/1988 |
| JP | 63-134007 | 6/1988 |
| JP | 01-218676 | 8/1989 |
| JP | 2-107314 | 4/1990 |
| JP | 04-238970 | 8/1992 |
| JP | 5-015749 | 1/1993 |
| JP | 5-076861 | 3/1993 |
| JP | 5-51289 | 7/1993 |
| JP | 6-134241 | 5/1994 |
| JP | 9-155160 | 6/1997 |
| JP | 10-005755 | 1/1998 |
| JP | 10-128063 | 5/1998 |
| JP | 10-296233 | 11/1998 |

OTHER PUBLICATIONS

Japanese Office Action issued Jan. 6, 2004 (with English translation of relevant portion).
Japanese Office Action dated Jun. 10, 2003 (with English translation).
Japanese Office Action issued Apr. 13, 2004.
European Search Report dated Feb. 7, 2002.

* cited by examiner

Primary Examiner—Betsy Morrison Hoey
(74) Attorney, Agent, or Firm—Dickstein, Shapiro, Morin & Oshinsky, LLP.

(57) ABSTRACT

A solvent separator includes an introduction member which introduces a mixture including chlorine containing organic solvent and water; a separation unit including a separation member made of a water-repellent and/or lipophilic porous material, which carries out the separation of the mixture; a water drainage member through which water separated by the separation unit is discharged; and a solvent drainage member through which the chlorine containing organic solvent separated by the separation unit is discharged. Also, a method and a device for treating waste liquid are provided by which chlorine containing organic solvent present in waste liquid is selectively separated, decomposed by a photocatalyst, and converted into a harmless substrate.

14 Claims, 10 Drawing Sheets

METHOD AND DEVICE FOR TREATING WASTE LIQUID, SOLVENT SEPARATOR, AND CLEANING DEVICE USING THEREOF

BACKGROUND OF THE INVENTION

1. Field of the Invention

The present invention relates to a method and a device for treating waste liquid, solvent separator and a cleaning or a dry cleaning device using the device or the separator. More specifically, the present invention relates to a method and a device for treating a waste liquid by which a chlorine containing organic solvent present in the exhaust gas or waste liquid generated during a process using a chlorine containing organic solvent, such as trichloroethylene used in a metal part washing device, or tetrachloroethylene used in a dry cleaning device, is selectively separated, decomposed by a photocatalyst, and made harmless. The present invention also relates to a solvent separator which may be used for selectively separating/collecting an organic solvent containing chlorine from a waste liquid, and a cleaning or a dry cleaning device using such a device or solvent separator. The solvent separator of the invention possesses an excellent processing efficiency.

2. Description of Related Art

Chlorine containing organic solvents have been widely used because they are excellent cleaning agents due to their superior cleaning properties, stability, and non-flammability.

Recently, since the chlorine containing organic solvents are considered to be hazardous air pollutants and designated as the priority controlled substances, self-regulated substances, etc., in air pollution control laws, various attempts have been made, such as one utilizing an adsorption method using activated carbon or a heat vaporization treatment method, to decrease the amount of chlorine containing organic solvents contained in the waste liquid or exhaust gas discharged from cleaning devices, such as dry cleaning devices, to within the emission standard value (for example, 0.1 mg/L of tetrachloroethylene in Japan) defined in the Water Pollution Control Law.

In an adsorption method using activated carbon, it is necessary to replace the activated carbon when the adsorption capacity of the activated carbon is saturated. However, it is difficult to determine when the activated carbon has lost its adsorption capacity. Also, it is necessary for the user to dispose of the adsorption-saturated activated carbon as designated waste, or to recycle it after subjecting it to a desorption-regeneration process using water vapor. Accordingly, the use of activated carbon is inefficient and gives rise to extra costs.

On the other hand, by using a heat vaporization treatment method, the concentration of chlorine containing organic compounds in waste liquid can be decreased to within emission standard values by vaporizing the waste liquid. However, according to this method, there is the problem that the treatment efficiency is decreased when the concentration of the chlorine containing organic compounds in waste liquid is low. Also, since the vaporized chlorine containing organic compounds are emitted to the air without being decomposed, there is a problem that the amount of chlorine containing organic compounds in the exhaust gas discharged in the environment cannot be substantially controlled.

Also, since regulations relating to the emission of chlorine containing organic compounds have been made increasingly stringent, there is demand for a method and a device for treating waste liquid having an excellent decomposition efficiency.

In addition, since water is usually contained in the waste liquid discharged from a cleaning device, such as a dry cleaning device, it is necessary to separate the water from the waste liquid in order to collect the chlorine containing organic solvent. Conventionally, methods in which the difference in specific gravity between a chlorine containing organic solvent and water is utilized to separate the chlorine containing organic solvent from water have been generally employed. When aqueous waste liquid containing water and a chlorine containing organic solvent is left to stand in a container, water and the solvent are separated in two layers and the chlorine containing organic solvent whose specific gravity is larger than water constitutes the lower layer. The chlorine containing organic solvent present in the lower layer is discharged and separated from the water.

However, if the chlorine containing organic solvent is dispersed and present in waste liquid in a fine particle state, it is difficult to achieve perfect separation of the solvent and some of the solvent remains in the water. Also, if the waste liquid is collected and addition and discharge of the waste liquid are carried out repeatedly in a recovery container, the chlorine containing organic solvent and water, which have been separated in two layers, are again mixed and dispersed, and then discharged in the dispersed state. Accordingly, by using a conventional separation method which utilizes the difference in specific gravity between a chlorine containing organic solvent and water, it is not possible, or at least difficult, to decrease the concentration of chlorine containing organic compounds in the waste liquid to a level satisfying the above-mentioned emission standards.

Moreover, since the laws for regulating discharge of the above-mentioned chlorine containing organic compounds are becoming increasingly stringent, there is a demand for a method and a device for treating waste liquid having a better separation efficiency have been awaited.

SUMMARY OF THE INVENTION

The present invention takes into consideration the above-mentioned circumstances, and has an object of providing a method for treating waste liquid in which a solvent separation process is incorporated in a series of processes for decomposing chlorine containing organic solvent present in waste liquid so that the treatment efficiency is improved and the emission of secondary by-products such as chlorine gas is decreased. The present invention also provides a device which is used for the above-mentioned method, and a cleaning or a dry cleaning device using the device for treating waste liquid, which are capable of automating the above-mentioned series of processes. In addition, the present invention provides a solvent separation device capable of selectively separating and collecting chlorine containing organic solvents, especially, finely dispersed chlorine containing organic solvents, contained in waste liquid with excellent processing efficiency.

The above objects may be achieved by a solvent separator including: an introduction member which introduces a mixture comprising chlorine containing organic solvent and water; a separation unit comprising a separation member made of a water-repellent and/or lipophilic porous material, which carries out the separation of the mixture; a water drainage member through which water separated by the separation unit is discharged; and a solvent drainage member through which the chlorine containing organic solvent separated by the separation unit is discharged.

The present invention also provides a solvent separator including: an introduction member which introduces a mixture comprising chlorine containing organic solvent and water; a separation unit comprising a separation member made of a water-repellent and/or lipophilic porous material, which carries out the separation of the mixture; a water drainage member through which water separated by the separation unit is discharged; a supply member which supplies air to the separation unit to vaporize the chlorine containing organic solvent; and an exhaust member through which the air supplied by the supply member and/or vaporized chlorine containing organic solvent is discharged.

In accordance with another aspect of the invention, the shape of the separation member is a film, plate, tube, container, or granules.

The present invention also provides a dry cleaning device including the above-mentioned solvent separator.

The above objects may also be achieved by a method for treating waste liquid including the steps of: carrying out a solvent separation process in which chlorine containing organic solvent present in the waste liquid is separated; carrying out a vaporization treatment process in which a part of the chlorine containing organic solvent remains in the waste liquid after the solvent separation process is vaporized; carrying out a photooxidation-decomposition process in which gases vaporized from the waste liquid are subjected to a photooxidation-decomposition treatment; and carrying out an after-treatment process in which decomposition product gases produced by the photooxidation-decomposition treatment are converted into a harmless substrate.

In accordance with another aspect of the invention, the decomposition product gases are adsorbed, and/or absorbed, and neutralized in the after-treatment process to be converted into a harmless substrate.

In yet another aspect of the invention, the solvent separation process is performed prior to the vaporization treatment process.

In yet another aspect of the invention, the waste liquid is made to contact a separation member made of a water-repellent and/or lipophilic porous member so that the chlorine containing organic solvent present in the waste liquid is adsorbed by the separation member in the solvent separation process.

In yet another aspect of the invention, the vaporization treatment process is performed by using an aeration method.

In yet another aspect of the invention, the vaporization treatment process further includes a step of vaporizing the chlorine containing organic solvent adsorbed by the separation member.

The above objects may also be achieved by a waste liquid treatment device, including: a solvent separation unit which separates chlorine containing organic solvent present in waste liquid; a vaporization treatment unit which vaporizes a part of the chlorine containing organic solvent which is not separated by the solvent separation unit and remains in the waste liquid; a photooxidation decomposition processing unit which photooxidizes and decomposes gases vaporized from the waste liquid by the vaporization treatment unit; an after-treatment unit which converts decomposition product gases produced by the photooxidation-decomposition processing unit into a harmless matter; and a control unit including a sequencer which controls an operation of the solvent separation unit, the vaporization treatment unit, the photooxidation decomposition processing unit, and the after-treatment unit.

In accordance with another aspect of the invention, the after-treatment unit adsorbs, and/or absorbs, and/or neutralizes the decomposition product gases in order to convert the decomposition product gases into a harmless substance.

The present invention also provides a cleaning device including the above-mentioned waste liquid treatment device.

The present invention also provides a dry cleaning device including the above-mentioned waste liquid treatment device.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples of the invention.

The solvent separator according to an embodiment of the present invention includes, as mentioned above, an introduction member which introduces a mixture including a chlorine containing organic solvent and water; a separation unit including a separation member made of a water-repellent and/or lipophilic porous material, which carries out the separation of the mixture; a water drainage member through which the water separated by the separation unit is discharged; and a solvent drainage member through which the chlorine containing organic solvent separated by the separation unit is discharged. Further, the solvent separator according to another embodiment of the present invention includes an introduction member which introduces a mixture including a chlorine containing organic solvent and water; a separation unit including a separation member made of a water-repellent and/or lipophilic porous material, which carries out the separation of the mixture; a water drainage member through which the water separated by the separation unit is discharged; a supply member which supplies air to the separation unit to vaporize the chlorine containing organic solvent; and an exhaust member through which the air supplied by the supply member and/or vaporized chlorine containing organic solvent is discharged.

The porous material used for the separation member according to an embodiment of the invention may be made of a sintered compact of a water-repellent and/or lipophilic polyolefine type resin or fluororesin. Examples of the polyolefine type resin include polyethylene (hereinafter abbreviated as "PE"), polypropylene (hereinafter abbreviated as "PP"), and ultrahigh molecular weight polyethylene (hereinafter abbreviated as "UHPE"). Also, examples of the fluororesin include polytetrafluoroethylene (hereinafter abbreviated as "PTFE"). It is preferable to use UHPE having an average molecular weight between about 100,000 and 5,000,000 as the resin forming the porous material according to the present invention.

Moreover, the porous material used in the present invention has continuous pores, and the pore size thereof is preferably between about 10 and 300 $\mu$m, and more preferably between about 20 and 100 $\mu$m. The ratio of vacancy of the porous material is preferably about 5–50%, and more preferably about 10–30%.

As shown in FIGS. 1A through 1D, the separation member used in the present invention may be in the shape of a film, plate, tube, container, or granule.

Figure 1A:
FIGS. 1A through 1D are schematic diagrams showing separation units made of a porous material which may be used in embodiments of the present invention.
Figure 1B:
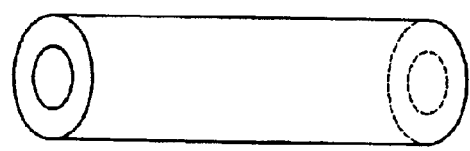
Figure 1C:
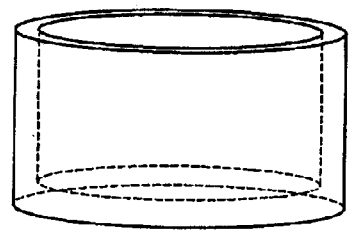

The size of the separation member of the film or plate shape shown in FIG. 1A, of the tubular shape shown in FIG. 1B, and of the container shape shown in FIG. 1C may be suitably determined in accordance with the size of the solvent separator used. It is preferable that the thickness of the separation member be about 2–10 mm, more preferably be about 5–10 mm.

Figure 1D:
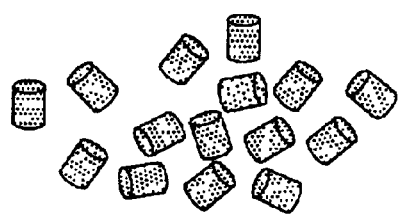

The separation members shown in FIG. 1D have a cylindrical shape having an outer diameter of about 1–10 mm, and a length of about 3–10 mm.

When a mixture of water and a chlorine containing organic solvent makes contact with the surface of the separation member, the chlorine containing organic solvent is adsorbed on the surface of the separation member and diffused into the separation member due to its surface tension. Also, since the separation member is made of a water-repellent and/or a lipophilic resin, water cannot permeate the inside thereof, and therefore, it becomes possible to separate the chlorine containing organic solvent from the water.

The separation member of the invention is capable of adsorbing chlorine containing organic solvents, the amount of which corresponds to the weight of the separation member. Accordingly, the amount of the separation member used may be suitably determined in accordance with the expected amount of the chlorine containing organic solvents to be treated in one process.

Next, the solvent separator according to an embodiment of the present invention will be described in detail with reference to FIGS. 2 through 5.

Figure 2:
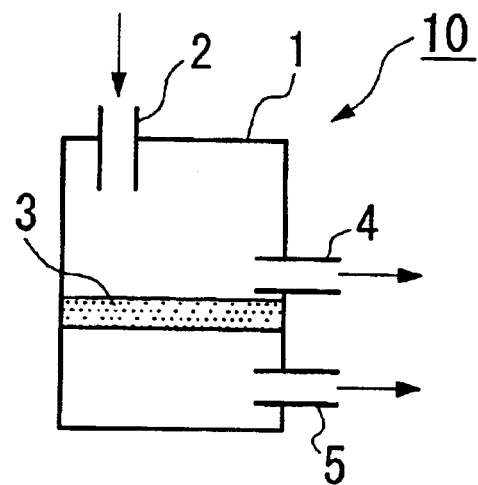
FIG. 2 is a diagram showing a cross-sectional view of a solvent separator according to an embodiment of the present invention.

FIG. 2 is a diagram showing a cross-sectional view of a solvent separator according to an embodiment of the present invention.

The solvent separator 10 in FIG. 2 includes a vessel 1, an introduction member 2, a separation unit 3, a water drainage member 4, and a solvent drainage member 5. The introduction member 2 introduces waste liquid discharged from a cleaning device, such as a dry cleaning device, into the vessel 1. The introduction member 2 may be disposed at the upper portion of the vessel 1. The separation unit 3 includes a separation member which may be made of a porous material, and separates waste liquid into water and chlorine containing organic solvents. The separation unit 3 is placed in the vessel 1. The water drainage member 4 discharges water, which has been separated by the separation unit 3, from the vessel 1. The water drainage member 4 may be disposed at a side portion of the vessel 1 at a position higher than the position of the separation unit 3. The solvent drainage member 5 discharges the solvent, which has been separated by the separation unit 3, from the vessel 1. The solvent drainage member 5 may be disposed at a side or bottom portion of the vessel 1 at a position lower than the position of the separation unit 3.

The vessel 1 may be a container in the shape of cylinder, square pole, etc. and may be made of, as a raw material, a polyethylene type resin, a fluororesin, or a stainless steel having excellent corrosion resistance properties, chemical resistance properties and so forth. Also, it is possible to use a container having an inner surface covered by such a resin or a stainless steel, as the vessel 1. The size of the vessel 1 may be suitably determined based on the amount of solvents treated.

For the introduction member 2, the water drainage member 4, and the solvent drainage member 5, a tube made of a polymeric material, such as a fluororesin, a polyester type resin, or a nylon type resin, or a metal, such as a stainless steel, having an excellent corrosion resistance properties and chemical resistance properties may be utilized. Also, it is possible to use a tube having an inner surface covered by such a resin or a metal, for the introduction member 2, the water drainage member 4, and the solvent drainage member 5.

The separation unit 3 includes a separation member which is formed by a porous material of a film or plate shape having the thickness of about 2–10 mm. The size of the separation member may be suitably determined in accordance with such factors as the amount of solvents treated or the size of the solvent separator 10.

When waste liquid is introduced into the vessel 1 via the introduction member 2 and makes contact with the separation member of the separation unit 3, only chlorine containing organic solvents contained in the waste liquid are adsorbed by and permeate through the separation member of the separation unit 3. The chlorine containing organic solvent is then discharged from the vessel 1 through the solvent drainage member 5 which is disposed at the lower portion of the solvent separator 10. On the other hand, water and/or a chlorine containing organic solvent dissolved in water, which does not permeate through the separation member of the separation unit 3, is discharged from the vessel 1 via the water drainage member 4.

The solvent separator 10 may be suitably used for cases where a chlorine containing organic solvent is separated by utilizing a difference in specific gravity.

Figure 3:
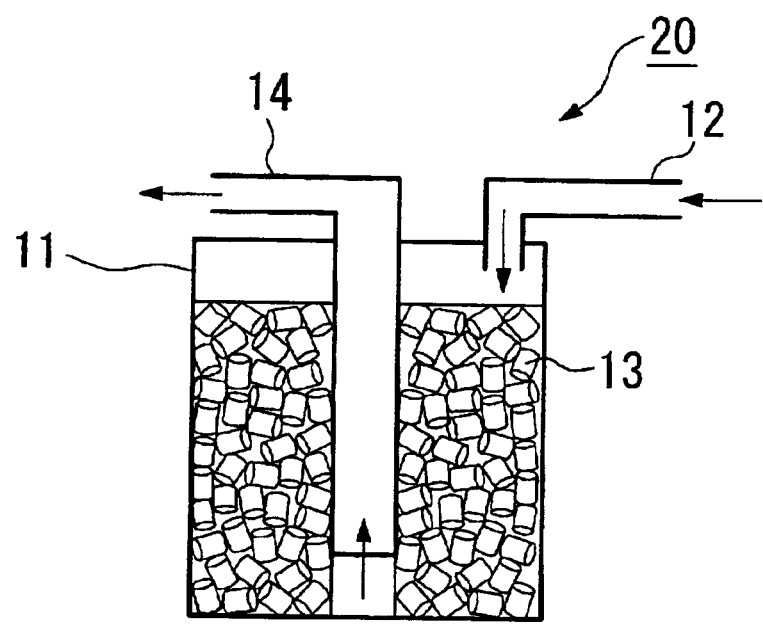
FIG. 3 is a diagram showing a cross-sectional view of a solvent separator according to another embodiment of the present invention.

FIG. 3 is a diagram showing a cross-sectional view of a solvent separator according to another embodiment of the invention.

In FIG. 3, a solvent separator 20 includes a vessel 11, an introduction member 12, a separation unit 13, and a drainage member 14. The introduction member 12 is used to supply air for vaporizing a chlorine containing organic solvent which is discharged from a cleaning device, such as a dry cleaning device. The introduction member 12 may be disposed at the upper portion of the vessel 11. The separation unit 13 includes a separation member which may be made of a porous material, and separates the waste liquid into water and a chlorine containing organic solvent. The separation unit 13 is disposed in the vessel 11. The drainage member 14 is to discharge water or chlorine containing organic solvent, which is separated by the separation unit 13, from the vessel 11. The drainage member 14 may be disposed so as to start at a location near the bottom of the vessel and pass through the top thereof.

The vessel 11 may be a container in the shape of cylinder, square pole, etc. and may be made of, as a raw material, a polyethylene type resin, a fluororesin, or a stainless steel having excellent corrosion resistance properties, chemical resistance properties, etc. Also, it is possible to use a container having an inner surface covered by such a resin or a stainless steel, as the vessel 11. The size of the vessel 11 may be suitably determined based on the amount of solvent treated.

For the introduction member 12, and the drainage member 14, a tube made of a polymeric material, such as a fluororesin, a polyester type resin, or a nylon type resin, or a metal, such as a stainless steel, having excellent corrosion resistance properties and chemical resistance properties may be utilized. Also, it is possible to use a tube having an inner surface covered by such a resin or a metal, for the introduction member 12, and the drainage member 14.

The separation unit 13 includes a separation member which is formed by a porous material of a cylindrical granular shape having a diameter of about 1–10 mm and a length of about 3–10 mm. The separation member may be added to the vessel 11 and the amount thereof may be suitably determined in accordance with such factors as the amount of solvent treated or the size of the vessel 11.

When waste liquid is introduced into the vessel 11 via the introduction member 12 and makes contact with the separation member of the separation unit 13, only the chlorine containing organic solvent contained in the waste liquid is adsorbed by the separation member of the separation unit 13. Water and/or a chlorine containing organic solvent still dissolved in the water are discharged from the vessel 11 via the drainage member 14.

After discharging the water and/or chlorine containing organic solvent dissolved in the water, air is supplied to the separation member via the introduction member 12 in order to vaporize the chlorine containing organic solvent adsorbed by the separation member and to discharge it through the drainage member 14. In this manner, the discharge of the gasified chlorine containing organic solvent is completed, and the separation member of the separation unit 13 is regenerated. After this, it becomes possible to reuse the separation member and adsorb chlorine containing organic solvent, the amount of which corresponds to the weight of the separation member, when waste liquid is introduced into the vessel 11 via the introduction member 12.

Although it is possible to use untreated atmospheric air and supply it through the introduction member 12 in order to vaporize and discharge chlorine containing organic solvent, it is preferable to dry or heat the air prior to supplying it to the vessel 11 in order to enhance the vaporization efficiency. When applying heat to the air, it is preferable to heat the air to a temperature equal to or higher than the boiling temperature of the chlorine containing organic solvent to be collected.

Since the solvent separator 20 according to this embodiment of the invention collects the chlorine containing organic solvent by adsorbing it onto the separation member and then vaporizing it, it becomes possible to collect the chlorine containing organic solvent efficiently. Also, the separation member may be easily regenerated for its next use.

Figure 4A:
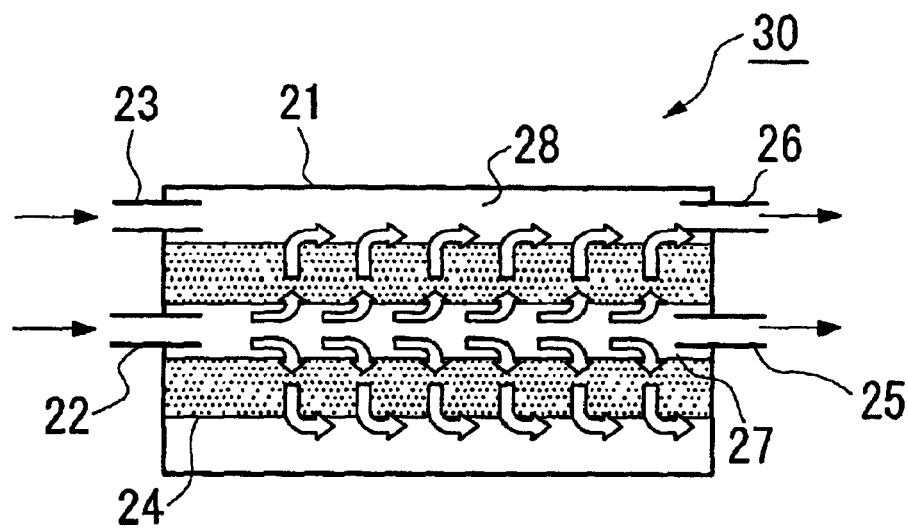
FIG. 4A is a diagram showing a cross-sectional view of a solvent separator according to yet another embodiment of the present invention.
Figure 4B:
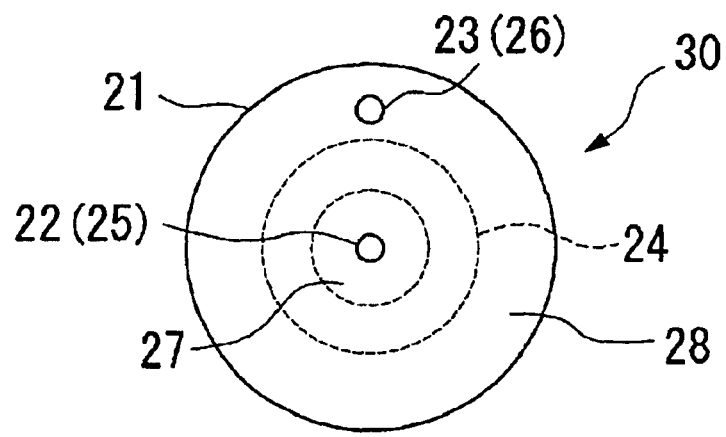
FIG. 4B is a diagram showing a side view of the solvent separator shown in FIG. 4A.

FIG. 4A is a diagram showing a cross-sectional view of a solvent separator according to another embodiment of the present invention. FIG. 4B is a diagram showing a side view of the solvent separator shown in FIG. 4A.

In FIGS. 4A and 4B, a solvent separator 30 includes a vessel 21, an introduction member 22, a supply member 23, a separation unit 24, a water drainage member 25, and a solvent exhaust member 26. The introduction member 22 is to introduce waste liquid discharged from a cleaning device, such as a dry cleaning device, into the vessel 21. The supply member 23 supplies air to the separation unit 24 in order to vaporize chlorine containing organic solvent. The separation unit 24 includes a separation member which may be made of a porous material, and separates the waste liquid into water and a chlorine containing organic solvent. The water drainage member 25 discharges water which is separated from the waste liquid. The solvent exhaust member 26 discharges chlorine containing organic solvent which has been vaporized. Also, the vessel 21 has a structure in which it is divided into an inner vessel 27 and an outer vessel 28 by the separation unit 24.

The vessel 21 may be a container of cylindrical shape and made of, as a raw material, a polyethylene type resin, a fluororesin, or a stainless steel having excellent corrosion resistance properties, chemical resistance properties etc. Also, it is possible to use a container having its inner surfaces covered by such a resin or a stainless steel, as the vessel 21. The size of the vessel 21 may be suitably determined based on the amount of solvent treated.

For the introduction member 22, the supply member 23, the water drainage member 25, and the solvent exhaust member 26, a tube made of a polymeric material, such as a fluororesin, a polyethylene type resin, or a nylon type resin, or a metal, such as a stainless steel, having excellent corrosion resistance properties and chemical resistance properties may be utilized. Also, it is possible to use a tube with an inner surface covered by such a resin or a metal, for the introduction member 22, the supply member 23, the water drainage member 25, and the solvent exhaust member 26.

The separation unit 24 includes a separation member which is made of a porous material of cylindrical shape having a thickness of about 2–10 mm. The size of the separation member may be suitably determined in accordance with such factors as the size of the vessel 21, however, it is preferable to use one having a longer length in order to increase the contact area with the solvent.

When waste liquid is introduced into the inner vessel 27 of the vessel 21 via the introduction member 22 and makes contact with the separation member of the separation unit 24, only the chlorine containing organic solvent contained in the waste liquid is diffused into and permeates through the separation member of the separation unit 24 to reach the outer vessel 28. When the chlorine containing organic solvent makes contact with air which is supplied to the outer vessel 28 via the supply unit 23, the chlorine containing organic solvent is vaporized and discharged via the solvent exhaust member 26.

Although it is possible to use untreated atmospheric air and supply it through the supply member 23 in order to vaporize the chlorine containing organic solvent and discharge it outside the vessel 21, it is preferable to dry or heat the air prior to supplying it to the vessel 21 in order to enhance the vaporization efficiency. When applying heat to the air, it is preferable to heat the air to a temperature equal to or higher than the boiling temperature of the chlorine containing organic solvent to be collected.

Since the solvent separator 30 according to this embodiment of the invention is capable of continuously carrying out the introduction of waste liquid, the separation, vaporization, and discharge of the chlorine containing organic solvent, the discharge of water and/or chlorine containing organic solvent dissolved in water, and the regeneration of the porous material which constitutes the separation unit 24, it is possible to efficiently carry out the separation of chlorine containing organic solvent.

Figure 5:
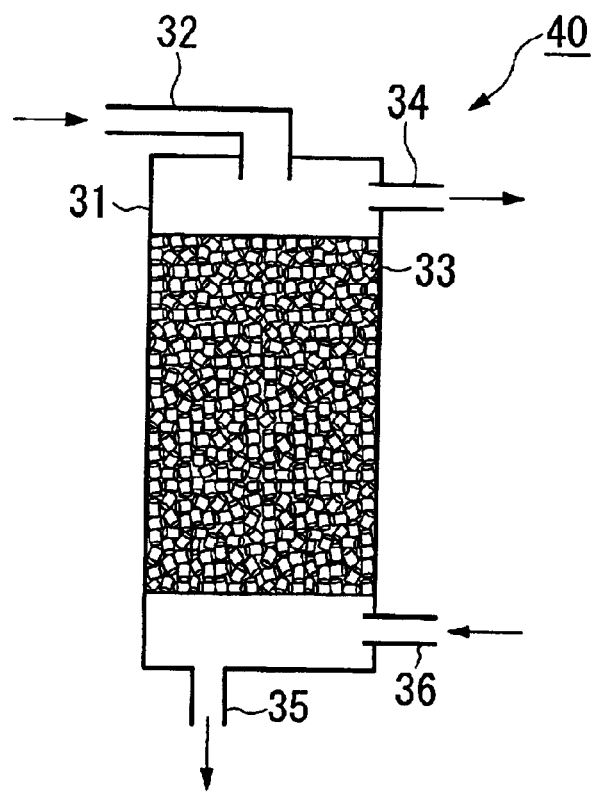
FIG. 5 is a diagram showing a cross-sectional view of a solvent separator according to yet another embodiment of the present invention.

FIG. 5 is a diagram showing a cross-sectional view of a solvent separator according to another embodiment of the present invention.

In FIG. 5, a solvent separator 40 includes a vessel 31, an introduction member 32, a separation unit 33, a solvent exhaust member 34, a water drainage member 35, and a supply member 36. The introduction member 32 introduces waste liquid discharged from a cleaning device, such as a dry cleaning device, into the vessel 31. The introduction member 32 may be disposed at the upper portion of the vessel 31. The separation unit 33 includes a separation member which may be made of a porous material, and separates the waste liquid into water and a chlorine containing organic solvent. The separation unit 33 is placed in the vessel 31. The solvent exhaust member 34 discharges a chlorine containing organic solvent, which is separated by the separation unit 33, from the vessel 31. The solvent exhaust member 34 may be disposed at a side portion of the vessel 31 at a position higher than the position of the separation unit 33. The water drainage member 35 discharges water and/or a chlorine containing organic solvent dissolved in water, which are separated by the separation unit 33, from the vessel 31. The water drainage member 35 may be disposed at a side or bottom portion of the vessel 31 at a position lower than the position of the separation unit 33. The supply member 36 supplies air to the separation unit 33 in order to vaporize the chlorine containing organic solvent. The supply member 36 may be disposed at a side portion of the vessel 31 at a position lower than the position of the separation unit 33.

The vessel 31 may be a container in the shape of a cylinder, square pole, etc. and may be made of, as a raw material, a polyethylene type resin, a fluororesin, or a stainless steel, which has excellent corrosion resistance properties, chemical resistance properties and so forth. Also, it is possible to use a container having an inner surface coated by such a resin or a stainless steel, as the vessel 31. The size of the vessel 31 may be suitably determined based on the amount of solvent treated.

For the introduction member 32, the solvent exhaust member 34, the water drainage member 35, and the supply member 36, a tube made of a polymeric material, such as a fluororesin, a polyethylene type resin, or a nylon type resin, or a metal, such as a stainless steel having excellent corrosion resistance properties and chemical resistance properties may be utilized. Also, it is possible to use a tube having its surface covered by such a resin or a metal, for the introduction member 32, the solvent exhaust member 34, the water drainage member 35, and the supply member 36.

The separation unit 33 includes a separation member which is formed by a porous material in the shape of cylindrical granules having a diameter of about 1–10 mm and a length of about 3–10 mm. The separation member may be filled in the vessel 31 and the amount thereof may be suitably determined in accordance with such factors as the amount of solvent treated or the size of the vessel 31.

When waste liquid is introduced into the vessel 31 via the introduction member 32, it may be dispersed onto the granular separation member from the top of the vessel 31 so that the chlorine containing organic solvent in the waste liquid may be easily diffused into the separation member, which constitutes the separation unit 33, from the surface thereof. When the waste liquid makes contacts the separation member, only the chlorine containing organic solvent contained in the waste liquid is adsorbed by the separation member of the separation unit 33. Water, which is not adsorbed by the separation member, and/or chlorine containing organic solvent still dissolved in water are discharged via the water drainage member 35. Also, when air is supplied to the separation unit 33 via the supply member 36 which is disposed at the lower portion of the vessel 31, the chlorine containing organic solvent adsorbed by the porous materials which forms the separation unit 33 is vaporized and discharged via the solvent exhaust member 34.

Although it is possible to use untreated atmospheric air and supply it to the separation member 33 via the supply member 36 in order to vaporize the chlorine containing organic solvent and discharge it outside the vessel 31 it is preferable to dry or heat the air prior to supplying it into the vessel 31 in order to enhance the vaporization efficiency. When applying heat to the air, it is preferable to heat the air to a temperature equal to or higher than the boiling temperature of the chlorine containing organic solvent to be collected.

Since the solvent separator 40 according to the embodiment of the invention is capable of continuously carrying out the introduction of waste liquid, the separation, vaporization, and discharge of the chlorine containing organic solvent, the discharge of water and/or chlorine containing organic solvent dissolved in water, and the regeneration of the porous material which constitutes the separation unit 33, it is possible to efficiently carry out the separation of chlorine containing organic solvent.

Figure 6:
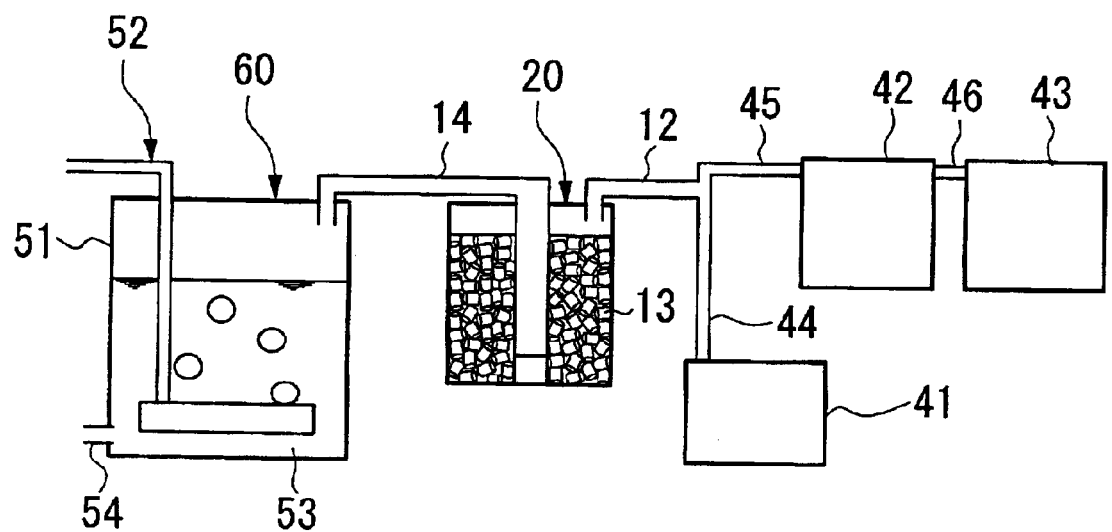
FIG. 6 is a diagram showing a waste liquid processing device of a dry cleaning device in which the solvent separator according to an embodiment of the present invention is employed.

FIG. 6 is a diagram showing a waste liquid processing device of a dry cleaning device in which the solvent separator according to an embodiment of the present invention is employed. In FIG. 6, the solvent separator 20 shown in FIG. 3 is used in the waste liquid processing device of a dry cleaning device.

The waste liquid processing device of the dry cleaning device in this embodiment includes the solvent separator 20 of the present invention, a waste liquid tank 41, a photo-oxidation decomposition processing unit 42, an after-treatment unit 43, and a vaporization treatment unit 60. The waste liquid tank 41 is used to temporarily store waste liquid discharged from the dry cleaning device. The photooxidation decomposition processing unit 42 photooxidizes and decomposes the chlorine containing organic solvent which has been separated and vaporized by the solvent separator 20.

Next, a process for treating a waste liquid using the above-mentioned waste liquid processing device will be described as follows.

First, waste liquid discharged from the dry cleaning device is collected and stored in the waste liquid tank 41. Then, the waste liquid is introduced into the solvent separator 20 via a waste liquid supply member 44 and the introduction member 12. The chlorine containing organic solvent which is dispersed in the waste liquid is adsorbed by the separation member of the separation unit 13, which is made of a porous material, and water and/or chlorine containing organic solvent still dissolved in the water are discharged to the vaporization treatment unit 60 via the drainage member 14. Compressed air is supplied into an aeration vessel 51 through a compressed air supply member 52 of the vaporization treatment unit 60 in order to vaporize the chlorine containing organic solvent contained in the waste liquid. The vaporized solvent is then introduced into the photooxidation decomposition processing unit 42 via the drainage member 14, the solvent separator 20, the introduction member 12, and the vaporized gas supply member 45. Also, the chlorine containing organic solvent, which has been adsorbed by the separation member, is vaporized by the compressed air supplied from the compressed air supply member 52, and is introduced into the photooxidation decomposition processing unit 42 via the introduction member 12 and the vaporized gas supply member 45. The vaporized chlorine containing organic solvent is photooxidized in the photooxidation decomposition processing unit 42, and decomposition product gases containing chlorine gas generated by a photooxidation decomposition reaction are introduced into the after-treatment unit 43 via a decomposition product gas supply member 46 so that the gases are absorbed, adsorbed, neutralized, and converted into non-toxic salts in the after-treatment unit 43.

An aeration method is used in the above-mentioned vaporization treatment unit 60. As shown in FIG. 6, the vaporization treatment unit 60 includes the drainage member 14, the compressed air supply member 52, an air diffuser member 53, and a drainage outlet 54. The drainage member 14 introduces waste liquid discharged from the solvent separator 20 into the aeration vessel 51 and discharges solvent gases which have been subjected to an aeration process. The compressed air supply member 52 is used to supply compressed air. The air diffuser member 53 is used to disperse the compressed air in the waste liquid. The drainage outlet 54 discharges drainage which has been subjected to the aeration process.

In this specification, the term "waste liquid" may mean a fluid to be treated, which is introduced into the waste liquid processing device of the present invention to be rendered nontoxic. On the other hand, the term "drainage" may mean a treated fluid, which has been subjected to a process of the waste liquid processing device to be rendered nontoxic.

The size of the aeration vessel 51 may be suitably determined in accordance with the amount of a fluid to be treated, and the aeration vessel 51 may be made of, as a raw material, a polymeric material, such as a fluororesin or a polyethylene type resin, or a metal, such as a stainless steel, having excellent corrosion resistance properties, chemical resistance properties, and water-repellent properties. Also, it is possible to use a container having inner surfaces coated by such a resin or a metal, for the aeration vessel 51.

Moreover, an agitation device of jet type, propeller type, etc. may be disposed in the aeration vessel 51 in order to increase the aeration efficiency.

Further, as a source for compressed air which is supplied from the compressed air supply member 52 and is used for the aeration process, one which is generally employed in the cleaning industry or washing industry may be utilized.

In addition, the vaporized gas supply member 45 may be made of a polymeric material, such as a fluororesin, a polyethylene type resin, or a nylon type resin, having an excellent corrosion resistance properties, and which is connected to the photooxidation decomposition processing unit 42.

The photooxidation decomposition processing unit 42 includes a photocatalyst reaction unit and an artificial light irradiation unit, which are disposed in a gas passage duct through which the vaporized gas supplied from the vaporized gas supply member 45 passes. Photocatalyst granules, which carry out the photooxidization and decomposition of organic materials in a gas, are contained in the photocatalyst reaction unit. The artificial light irradiation unit includes an ultraviolet light source which irradiates ultraviolet rays onto the photocatalyst granules.

An example of the above-mentioned photocatalyst granules is a mixture of an inorganic powder, which adsorbs chlorine containing organic gases or chlorine gases, and photocatalyst particles.

Examples of the above-mentioned inorganic powder include, for instance, powders of calcium silicate, calcium carbonate, sodium carbonate, lime, kaolin clay, wallastnite, talc, nepheline-sinite, zeolite, and activated carbon. These may be used singularly or in mixtures of two or more.

Examples of the above-mentioned photocatalyst particles include these which may be activated by the irradiation of light, for example, intravital ultraviolet, and enhance the photooxidation decomposition reaction of organic compounds which make contact with the photocatalyst particles. More concrete examples of such photocatalyst include $TiO_2$, CdS, $SrTiO_3$, and $Fe_2O_3$. In particular, use of $TiO_2$, which has an excellent performance and is obtainable at a low cost, is most preferable.

The content of the photocatalyst particles with respect to the above-mentioned photocatalyst granules is about 10–95 wt. %, preferably about 30–70 wt. %, and more preferably about 40–60 wt. %. If the content of the photocatalyst particles is less than 10 wt. %, the photooxidation decomposition capacity is decreased and there is a danger that chlorine containing organic gases may be discharged without being decomposed. If the content of the photocatalyst particles is greater than 95 wt. %, the ability of the photocatalyst granules to adsorb and retain chlorine containing organic gases is decreased and, when chlorine containing organic gases are rapidly introduced at high concentrations, there is the danger that the chlorine containing organic gases will not be captured and will be discharged without being decomposed.

Also, among the above-mentioned photocatalyst granules, those subjected to a compression molding process to be granular shape are suitably used. Examples of the shapes of the photocatalyst granules include spheres, barrels, short rods, ovoid, and tablets (i.e., a cylinder-like shape). Moreover, it is possible to form holes in the photocatalyst granules or projection on the surfaces thereof.

The particle size of the above-mentioned photocatalyst granules is about 1–20 mm, and preferably about 2–10 mm. Also, the average particle size of the above-mentioned photocatalyst granules is about 4–8 mm, and preferably about 5–7 mm. If the particle size is less than 1 mm, the photocatalyst granules may be clogged and the amount of gas passing through the photocatalyst reaction portion decreases. Accordingly, the photooxidation decomposition efficiency tends to decrease. If the particle size of the photocatalyst granules exceeds 20 mm, the specific surface area (i.e., the surface area per unit weight) of the photocatalyst granules decreases, and the light irradiated from an ultraviolet light source may not reach the center of the gas passage tube. Accordingly, the light receiving efficiency of the photocatalyst granules decreases, and hence, the photooxidation decomposition efficiency also tends to decrease.

The after-treatment unit 43 may be made of, as a raw material, a polyethylene type resin, a fluororesin, or a stainless steel having excellent corrosion resistance properties. Also, it is possible to use a container having inner surfaces coated by such a resin or a metal, for the after-treatment unit 43.

Agents for absorbing, and/or adsorbing, and/or neutralizing decomposition product gases, which are supplied by the decomposition product gas supply member 46, are provided with the after-treatment unit 43.

Examples of the above-mentioned agents include, for instance, alkali ion containing water which includes at least one selected from the group consisting of calcium sulfite, calcium silicate, sodium carbonate, sodium bicarbonate, sodium thiosulfate, calcium carbonate, lime, ammonia, caustic soda, sodium bicarbonate; alkali ion water, and water.

The state of the above-mentioned agents is not limited to the liquid phase, and may be a powdery fluidized bed or a mixture of the two.

In the waste liquid processing device having the above-mentioned structure, gases including chlorine containing organic gas, which are vaporized from waste liquid by the vaporization treatment unit 60, are photooxidized and decomposed by the photooxidation decomposition processing unit 42, and the decomposition product gas including chlorine gas thus produced is converted into nontoxic salts by the after-treatment unit 43. Accordingly, it becomes possible to decrease the amounts of drainage discharged after treatment, chlorine containing organic materials contained in the exhaust gas, and chlorine containing gases which are secondary by-products, to be within the emission standard values, and hence, the present invention may contribute to the prevention of environmental pollution.

Also, since the chlorine containing organic materials contained in the waste liquid discharged from such devices as a dry cleaning device are first vaporized in the vaporization treatment unit 60 and then subjected to a photooxidizing decomposition process in the photooxidation decomposition processing unit 42, it becomes possible to increase the photooxidation decomposition efficiency and to decrease the time or expenses required by the process, as compared with a case where waste liquid is directly subjected to a photooxidation decomposition process.

Moreover, since a mixture of an inorganic powder, which adsorbs chlorine containing organic gases or chlorine gases, and photocatalyst particles is used as the photocatalyst granules, and chlorine containing organic gases are subjected to the photooxidation decomposition process in the state of being adsorbed and retained by the photocatalyst granules, the photooxidation decomposition efficiency is enhanced and undecomposed chlorine containing organic materials are not discharged outside the photooxidation decomposition processing unit 42.

Next, a concrete embodiment of the present invention will be described. However, it is to be understood that this is for the purpose of illustration only and that various changes and modifications may be made without departing from the scope of the invention.

In this embodiment, the solvent separator 20 shown in FIG. 3 was employed. Also, in the solvent separator 20, a container having an outer diameter at its bottom surface of 80 mm and a height of 140 mm and having the shape of cylinder was used as the vessel 11. Moreover, a separation unit made of a porous material comprising a sintered compact of UHPE having an average molecular weight of between 100,000 and 5,000,000 was put into the vessel 11. The porous material had a pore size of 10–300 μm, and a vacancy ratio of 10–50%. As the introduction member 12 used to introduce air for vaporizing the chlorine containing organic solvent isolated from waste liquid or drainage, a nylon tube having an inner diameter of 4 mm and an outer diameter of 6 mm was employed. Also, as the drainage member 14 for discharging drainage from which the chlorine containing organic solvent has been isolated, or vaporized chlorine containing organic solvent, a tube made of polytetrafluoroethylene having an inner diameter of 4 mm and an outer diameter of 6 mm was utilized.

In addition, a vaporization treatment device (not shown in the figures) having an aeration vessel was used in order to carry out an aeration process for waste liquid from which the chlorine containing organic solvent had been isolated in the solvent separator 20.

Waste liquid (10 L) having a perchloroethylene (a chlorine containing organic solvent, hereinafter abbreviated as PCE) concentration of 200 mg/l was introduced into the solvent separator 20 and contacted the porous material. After that the PCE concentration of the waste liquid was measured. The results are shown in the row denoted "after solvent separation process" in Table 1.

Then, the aeration process was carried out for 60 minutes, during which the aeration amount and the internal pressure of the aeration vessel were maintained at 20 L/min and 2 kg/cm$^2$, respectively. The PCE concentration of the waste liquid was measured every 15 minutes.

On the other hand, the PCE concentration of the waste liquid was also measured, for comparison, for the case where only the aeration process was carried out, and the solvent separator 20 was not used.

Results are shown in Table 1 below.

TABLE 1

|  | PCE conc. (mg/l) with the solvent separator | PCE conc. (mg/l) w/o the solvent separator |
| --- | --- | --- |
| Stock solution | 200.00 | 200.00 |
| After solvent separation process | 87.50 | — |
| Aeration time (min.) | | |
| 0 | 87.50 | 200.00 |
| 15 | 0.50 | 5.00 |
| 30 | 0.10 | 7.00 |
| 45 | 0.04 | 1.75 |
| 60 | 0.02 | 0.43 |

It can be seen from the results shown in Table 1 that the PCE concentration was significantly decreased when the waste liquid, which had been treated in the solvent separator 20, was subjected to the aeration process as compared to the case where the waste liquid was subjected to the aeration process only and untreated in the solvent separator 20. Therefore, the results indicate that almost all the PCE which was dispersed in the waste liquid in an undissolved fine particle state, was adsorbed by the separation unit made of a porous material in the solvent separator 20 of the present invention.

Figure 7:
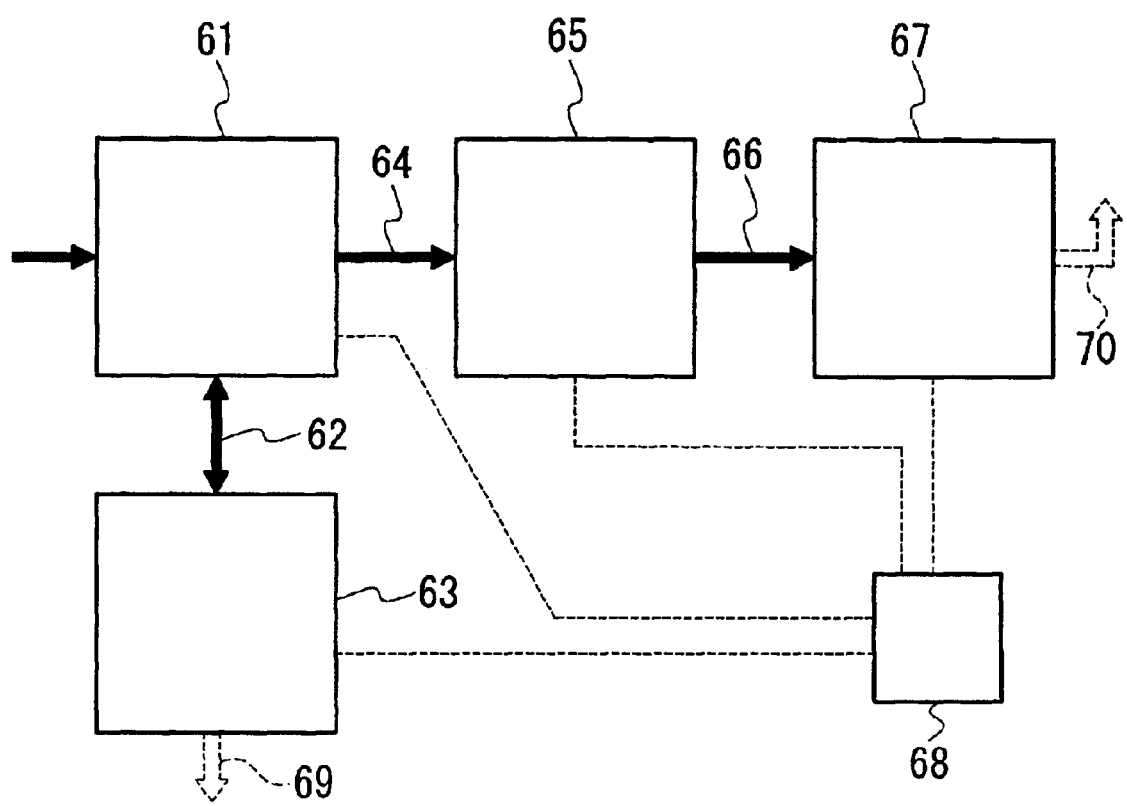
FIG. 7 is a schematic diagram for explaining a waste liquid treatment device according to an embodiment of the present invention.

FIG. 7 is a schematic diagram for explaining a waste liquid treatment device according to an embodiment of the present invention.

In FIG. 7, the waste liquid treatment device includes a solvent separation unit 61, a waste liquid supply line 62, a vaporization treatment unit 63, a vaporized gas supply line 64, a photooxidation decomposition processing unit 65, a decomposition product gas supply line 66, an after-treatment unit 67, and a control unit 68. In FIG. 7, the direction of the flow of chlorine containing organic solvent is indicated by arrows. The solvent separation unit 61 may be connected to the vaporization treatment unit 63 either directly or via the waste liquid supply line 62. Also, a drainage line for discharging drainage which has been subjected to an aeration process is connected to the vaporization treatment unit 63.

Moreover, the solvent separation unit 61 is connected to the photooxidation decomposition processing unit 65 via the vaporized gas supply line 64, and the photooxidation decomposition processing unit 65 is connected to the after-treatment unit 67 via the decomposition product gas supply line 66. Further, a line for discharging air containing non-harmful water vapor and carbon dioxide emitted from the after-treatment unit 67 is connected to the after-treatment unit 67. The control unit 68 controls the solvent separation unit 61, the vaporization treatment unit 63, the photooxidation decomposition processing unit 65, and the after-treatment unit 67.

As mentioned above, the solvent separation unit 61 may be disposed apart from the vaporization treatment unit 63. In this embodiment, however, the solvent separation unit 61 is disposed in the pathway before the front portion of the vaporization treatment unit 63, and selectively adsorbs the chlorine containing organic solvent which is dispersed in a fine particle state in waste liquid. In the next step, waste liquid which contains the chlorine containing organic solvent which has not been adsorbed by the solvent separation unit 61 is subjected to a vaporization treatment during an aeration process in the vaporization treatment unit 63. The vaporized gas containing vaporized chlorine containing organic gas which is generated in this process passes through the solvent separation unit 61 again. The vaporized gas vaporizes the chlorine containing organic solvent which has been adsorbed by the solvent separation unit 61 as it passes through the solvent separation unit 61, and all of these vaporized gases are introduced into the photooxidation decomposition processing unit 65 via the vaporized gas supply line 64. Then, the vaporized gases are photooxidized and decomposed by the photooxidation decomposition processing unit 65, and decomposition product gases containing chlorine gas generated by the photooxidation-decomposition reaction are introduced into the after-treatment unit 67 via the decomposition product gas supply line 66 so that the decomposition product gases are adsorbed, absorbed, and neutralized in the after-treatment unit 67 and converted into harmless salts. As a final step, a drainage treatment or exhaust treatment is carried out.

Next, a waste liquid treatment device according to another embodiment of the present invention will be described with reference to FIGS. 8 through 11.

Figure 8:
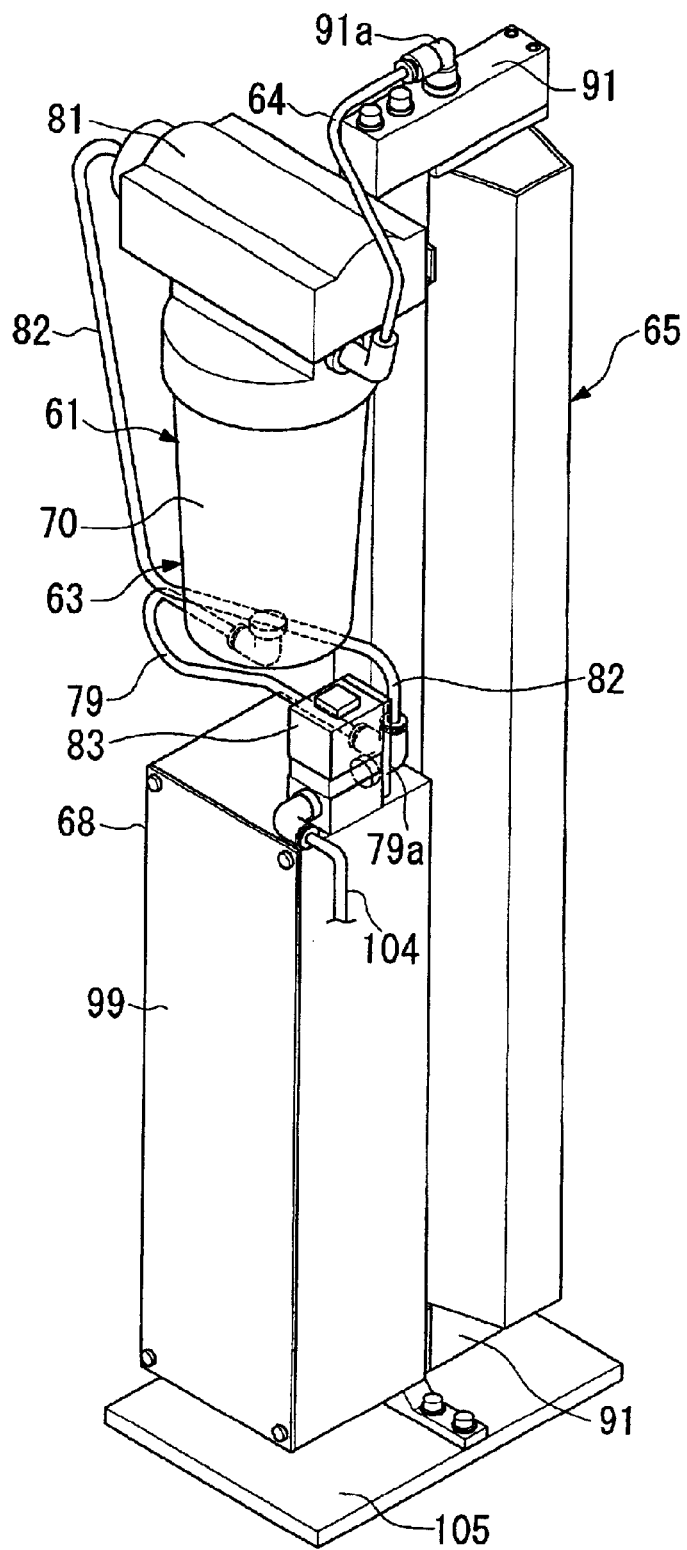
FIG. 8 is a diagram showing a schematic perspective view of a waste liquid treatment device according to another embodiment of the present invention.
Figure 9:
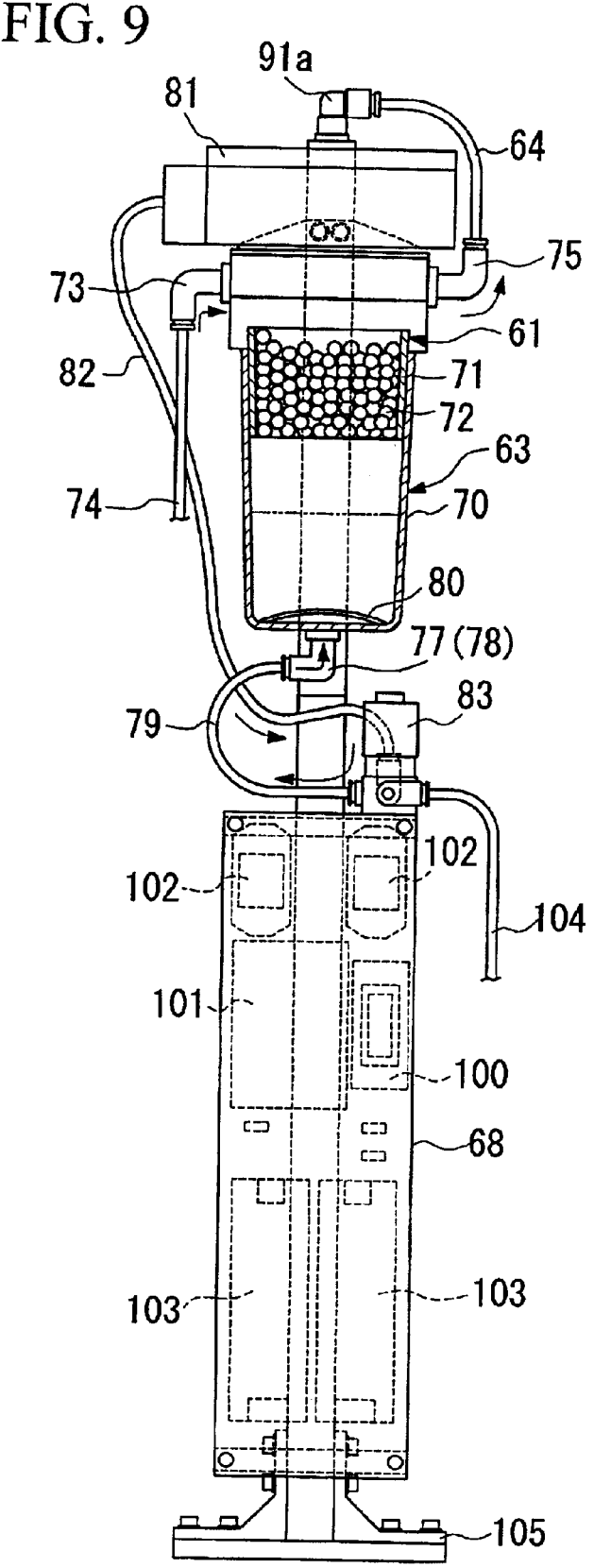
FIG. 9 is a diagram showing a schematic elevational view of the waste liquid treatment device shown in FIG. 8, some parts of which are shown in perspective.
Figure 10:
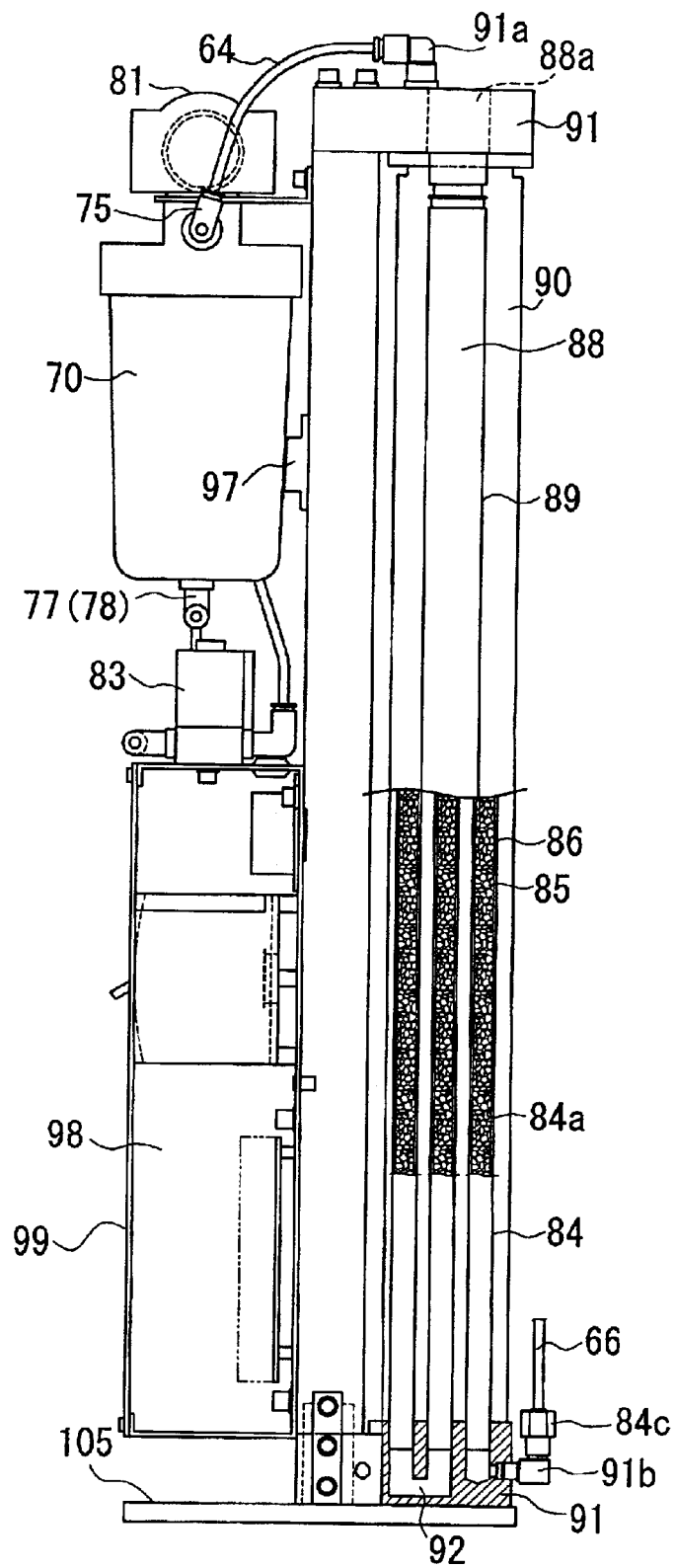
FIG. 10 is a diagram showing the side view of the waste liquid treatment device shown in FIG. 8, some parts of which are shown in perspective and in cross-sectional.
Figure 11:
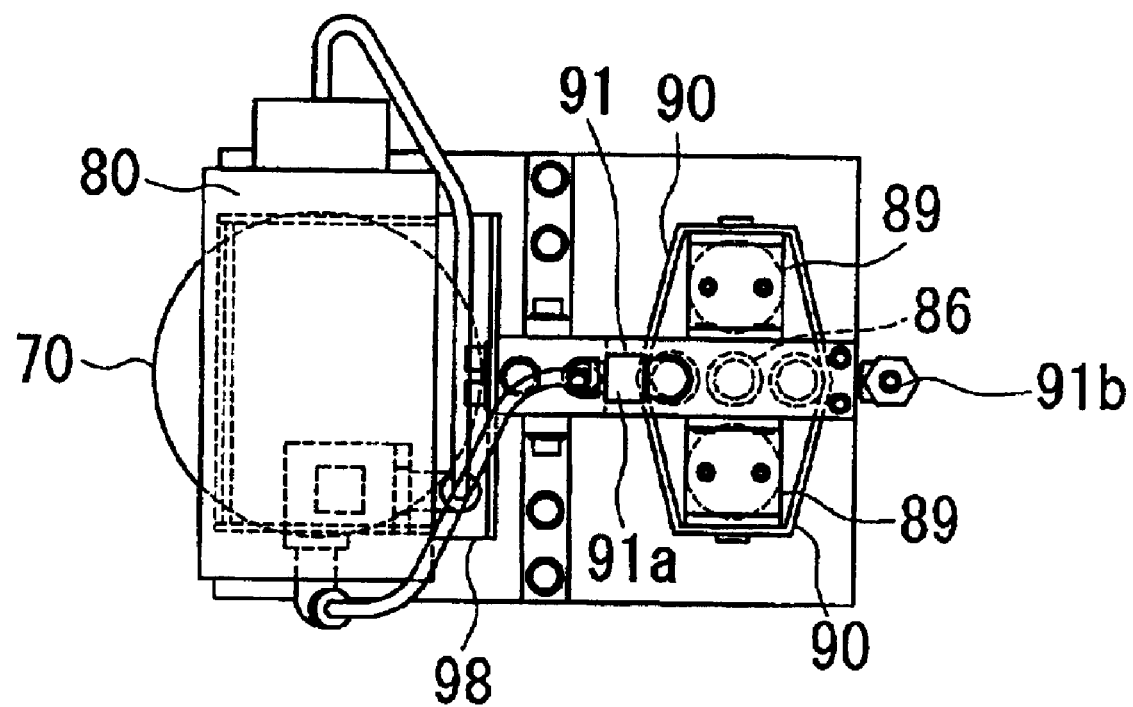
FIG. 11 is a diagram showing a schematic plan view of the waste liquid treatment device shown in FIG. 8, some parts of which are shown in perspective.

FIG. 8 is a diagram showing a schematic perspective view of a waste liquid treatment device according to an embodiment of the present invention. FIG. 9 is a diagram showing a schematic elevational view of the waste liquid treatment device shown in FIG. 8, some parts of which are shown in perspective. FIG. 10 is a diagram showing the side view of the waste liquid treatment device shown in FIG. 8, some parts of which are shown in perspective (and may be in cross-sectional). FIG. 11 is a diagram showing a schematic plan view of the waste liquid treatment device shown in FIG. 8, some parts of which are shown in perspective. In FIGS. 8 through 11, a separation member 72, which is formed by a porous material, is contained in the solvent separation unit 61.

As shown in FIG. 8, the solvent separation unit 61 has a structure in which the separation member 72 including granular porous materials is contained in a separation vessel 71 which is disposed at the upper portion of an aeration vessel 70.

The separation vessel 71 has a diameter of about 3–15 cm and a height of about 3–10 cm. The separation vessel 71 may be a container of cylindrical shape whose outer diameter is almost equal to the inner diameter of the upper portion of the aeration vessel 70, and whose upper and the lower surfaces may be in a mesh form. The separation vessel 71 may be made of, as a raw material, a polymeric material, such as a fluororesin or a polyethylene type resin, or a metal such as stainless steel, having excellent corrosion resistance properties, chemical resistance properties, and water-repellence properties. Also, it is possible to use a container made of a stainless steel having inner surfaces coated by such a resin, for the separation vessel 71.

Examples of the material which forms the separation member 72 contained in the separation vessel 71 include activated carbon, zeolite, and porous materials, such as a sintered compact of a water-repellent and/or lipophilic resin, which are capable of selectively adsorbing chlorine containing organic solvents in a waste liquid. Among them, it is preferable to use a porous material formed by a sintered compact of a water-repellent and/or lipophilic resin.

The separation member 72 has continuous pores and the pore size thereof is about 10–300 μm, preferably about 20–100 μm, and the vacancy ratio thereof is 5–50%, preferably about 10–30%.

Also, the shape of the separation member 72 may be spheres, cylinders, barrels, or rods having a volume of about 1–1,000 mm$^3$.

Moreover, the separation member 72 used in the present invention is capable of adsorbing a chlorine containing organic solvent in an amount corresponds to the weight thereof. Accordingly, the amount of the porous material may be suitably determined based on the amount of chlorine containing organic solvent expected to be treated in one process.

According to this embodiment of the present invention, waste liquid is supplied to the solvent separation unit 61 from the upper central portion of the aeration vessel 70. When the waste liquid passes through the separation member 72, chlorine containing organic solvent in a fine particle state present in the waste liquid is selectively adsorbed by the separation member 72.

Note that the solvent separation member 61 is not limited to the one mentioned above in which the separation member 72 in a granular state is contained in the separation vessel 71, and may be formed by a separation member 72 in the shape of a film, plate, or a grid.

The size of the separation member 72 in the shape of a film, plate, or grid may be suitably determined in accordance with the size of the aeration vessel 70, and the thickness thereof may be in the range between about 0.5 and 10 mm, preferably in a range between about 1 and 3 mm.

Examples of the water-repellent and/or lipophilic resin which may be used for the separation member 72 include polyolefin resins, fluororesins, and silicone resins. Examples of the polyolefin resin include PE, PP, and UHPE, and an example of the fluororesin is PTFE. It is preferable to use a UHPE having an average molecular weight of between about 100,000 and 5 million as the water-repellent and/or lipophilic resin used in the present invention.

In this embodiment, an aeration treatment unit is used as the vaporization treatment unit 63. As shown in FIGS. 8 through 10, the aeration treatment unit includes a waste liquid inlet portion 73, a vaporized gas outlet portion 75, a drainage outlet portion 77, and a compressed air inlet portion 78. The waste liquid inlet portion 73 which is used for introducing waste liquid, the vaporized gas outlet portion 75 which is used for discharging gases after the aeration process, and a gas intake portion (not shown in the figures) having a check valve may be disposed above the aeration vessel 70. On the other hand, the drainage outlet portion 77 which is used for discharging drainage after the aeration process, and the compressed air inlet portion 78 which is used for supplying a compressed air may be disposed below the aeration vessel 70.

The aeration vessel 70 has a diameter of about 3–15 cm and a height of about 10–30 cm. The aeration vessel 70 may be a pressure vessel of cylindrical shape, which is made of, as a raw material, a polymeric material such as a fluororesin or a polyethylene type resin having excellent corrosion resistance properties, chemical resistance properties, and water-repellence properties. Also, it is possible to use a container having inner surfaces coated by such a resin, for the aeration vessel 70.

Moreover, an agitation device of jet type, propeller type, etc. may be disposed in the aeration vessel 70 in order to increase the aeration efficiency.

The waste liquid inlet portion 73 is connected to a waste liquid supply unit (not shown in the figures) via a waste liquid supply line 74.

A waste liquid vessel of the waste liquid supply unit may be a container having the volume of 20 L or less, which is made of, as a raw material, a polymeric material such as a fluororesin or a polyethylene type resin, or a metal such as a stainless steel, having excellent corrosion resistance properties, chemical resistance properties, and water-repellence properties. Also, it is possible to use a container made of stainless steel having inner surfaces coated by such a resin, for the waste liquid vessel. Moreover, the drainage line from the water separator of the cleaning device, such as a dry cleaning device, is connected to the waste liquid vessel either directly or via a filter for removing dust. Further, a liquid level sensor for detecting the upper and the lower limits of the waste liquid may be provided with the waste liquid vessel.

In addition, a waste liquid supply pump is disposed in the above-mentioned waste liquid vessel and supplies waste liquid to the solvent separation unit 61 from the waste liquid vessel via the waste liquid supply line 74 and the waste liquid inlet portion 73 when a signal from the control unit (to be described below) is received. Also, a check valve is disposed at the outlet of the waste liquid supply pump so that the aeration gas does not flowup into the waste liquid vessel due to the air pressure in the aeration process. Note that an electromagnetic valve may be used instead of the check valve. Also, a pump for domestic use, such as one for drawing water in a bath, may be used as the waste liquid supply pump.

The drainage outlet portion 77 may also function as the compressed air inlet portion 78, and is connected to an intermediate tube 79 which may function as a drainage tube as well as a compressed air introduction tube.

Also, as a source for supplying the compressed air which may be used in the aeration process, an air diffusing pump which may be used for a domestic water tank may be utilized.

Moreover, in order to increase the aeration efficiency, an air diffusing member 80 comprising an air diffusing tube or an air diffusing plate may provided with the compressed air inlet portion 78 at the bottom portion of the aeration vessel 70.

An air pump 81 may be disposed on the aeration vessel 70 as a source for supplying air which is used for the aeration process. The air pump 81 is connected to the compressed air inlet portion 78 which may be located below the aeration vessel 70 via a compressed air supply tube 82, a branched joint 79a connected to the IN side of an electromagnetic valve 83, and the intermediate tube 79.

As the air pump 81, an air diffusing pump which may be used for a domestic water tank may be utilized.

A gas intake portion 76 having a check valve may be disposed at the upper portion of the aeration vessel 70 in order to prevent the generation of negative pressure in the aeration vessel 70 during the discharge of the treated drainage, which may stop the discharge of the drainage.

The vaporized gas outlet portion 75 is connected to the photooxidation decomposition processing unit 65 via the vaporized gas supply line 64 so that the vaporized gas after the aeration process may be emitted to the photooxidation decomposition processing unit 65. Also, the vaporized gas supply line 64 may be made of a polymeric material such as a fluororesin, a polyethylene type resin, or a nylon type resin, having excellent corrosion resistance properties.

The vaporization treatment unit 63 vaporizes the chlorine containing organic solvent adsorbed by the separation member 72 when the vaporized gas which has been subjected to the aeration process passes through the separation member 72, and supplies air including the chlorine containing organic gas to the photooxidation decomposition processing unit 65.

Also, the vaporization treatment unit 63, after discharging the treated drainage from the aeration vessel 70, supplies air by means of the air pump 81 so that the chlorine containing organic solvent, which was adsorbed by the separation member 72 but was not completely vaporized in the aeration air, can be vaporized in an efficient manner.

As shown in FIG. 10, the photooxidation decomposition processing unit 65 includes a photocatalyst reaction portion 86, artificial light irradiation members 89, and a reflection board member 90, all of which are disposed in a gas flow line 84 through which a vaporized gas supplied from the vaporized gas supply line 64 passes. As shown in the figure, photocatalyst granules 85, which photooxidize and decompose the chlorine containing organic materials in a gas, are contained in the photocatalyst reaction portion 86. The artificial light irradiation member 89 includes an ultraviolet light source 88 for irradiating ultraviolet rays onto the photocatalyst granules 85. As shown in FIG. 11, the artificial light irradiation members 89 are disposed so as to oppose the photocatalyst reaction portion 86.

The gas flow line 84 includes an inlet portion (not shown in the figures) located at an upper portion of a gas flow line connection fixing portion 91 and an outlet portion 84c located at the lower portion thereof. In the gas flow line 84, three straight tube members 84a are arranged in the same vertical face with a pitch interval of about 8–35 mm, and the adjacent straight tube members 84 are connected to each other by connection members 92 so as to form a single long gas passage.

Also, aeration gas supply port 91 a, which is connected to the first straight tube (glass tube) 84a, is disposed at the upper portion of the gas flow line connection fixing portion 91, and a decomposition product gas discharge port 91b, which is connected to the third straight tube (glass tube) 84a, is disposed at the lower portion of the gas flow line connection fixing portion 91.

Examples of materials used for making the straight tube members 84a include those which transmit artificial light, such as ultraviolet light, or natural light, and transparent materials, such as borosilicate glass or synthetic resins, may be employed.

The inner diameter of the straight tube members 84a may be in the range between about 5 and 30 mm, preferably in the range between about 8 and 16 mm. If the inner diameter is smaller than 5 mm, the photooxidation-decomposition treatment efficiency is decreased due to the decrease in the amount of the photocatalyst granules 85 contained in the gas flow line 84. Also, the system throughput is decreased due to the decrease in the gas flow caused by the small diameter of the straight tube member 84a. If the inner diameter of the straight tube members 84a exceeds 30 mm, on the other hand, light irradiated from the ultraviolet light source 88 will scarcely reach the center portion of the straight tube member 84a, and the photooxidation-decomposition treatment efficiency will decrease due to the decrease in the light receiving efficiency of the photocatalyst granules 85.

Also, the length of the straight tube members 84a is determined to be within the range of about 200–800 mm. It is preferable that the length of the straight tube members 84a be substantially equal to the length of the ultraviolet light source 88.

In this manner, ultraviolet light from the ultraviolet light source 88 may be uniformly irradiated onto the photocatalyst granules 85 over the entire photocatalyst reaction portion 86.

Also, holding members (not shown in the figures) for holding the photocatalyst granules 85 in the straight tube member 84 are disposed at both ends of the straight tube member 84. Examples of the materials which can be used for the holding member include a polymeric material such as a fluororesin, a polyethylene type resin, or a nylon type resin having excellent corrosion resistance properties. The materials used for the holding member should have a structure which enables a gas flow therethrough, and it is preferable that the diameter thereof be substantially the same as the inner diameter of the straight line 84a with a thickness of about 5–30 mm.

Examples of the photocatalyst granules include a mixture of an inorganic powder, which adsorbs chlorine containing organic gases or chlorine gases, and photocatalyst particles. Concrete examples of the inorganic powder and the photocatalyst particles, the amount of the photocatalyst particles contained in the photocatalyst granules 85, and the shape and the particle size of the photocatalyst granules are substantially the same as the ones described above and their explanation is omitted.

The connection member 92 includes a body portion (not shown in the figures), which connects the end portions of the straight tube member 84a, a cover portion (not shown in the figures), which may be attached to the body portion, and an O-ring (not shown in the figures), which is an annular sealing member.

The body portion may be a rectangular member having an opening part in which an end portion of the straight tube member 84a is inserted. Gases or air passes through a passage (not shown in the figures) provided in the body portion from one of the straight tube member 84a to the other which is inserted in the opening part of the body portion.

It is preferable that the inner surfaces of the passage be coated by a polymeric material, such as a fluororesin or a polyethylene type resin, having an excellent corrosion resistance properties, chemical resistance properties, etc., or that the body portion itself be formed by a metal, such as hastelloy, or a polymeric material, such as a fluororesin, a polyethylene type resin, or a PPS, having excellent corrosion resistance properties and chemical resistance properties.

A tapered portion for accommodating the O-ring, which gradually increases its diameter towards the end of the opening part, is formed at the periphery of the opening part, and the O-ring is disposed between the tapered portion and the straight tube member 84a.

The cover portion includes holes in which the straight tube member 84a is inserted, and is attached to the body portion so as to contact the opening end of the body portion.

The O-ring is disposed, as mentioned above, between the tapered portion and the straight tube member 84a so as to contact all of the body portion, the cover portion, and the outside surface of the straight tube member 84a. The O-ring may be made of an elastic material, such as a rubber, and it is preferable that the O-ring be in an elastically deformed state being compressed by the body portion and the cover portion.

Also, the diameter of the opening part at the upper end side of the main portion and the diameter of the hole of the cover portion are designed to be larger than the outer diameter of the straight tube member 84a so that the straight tube member 84a may be moved in its lengthwise direction.

Moreover, the straight tube member 84 is designed so that when it is moved upwards, the lower end of the straight tube member 84 detaches from the upper face of the cover member, and the straight tube member 84 may be inclined in order to allow for easy replacement of the straight tube member 84a without removing the cover portion. Assuming that the length of the lower end of the straight tube member 84a which is inserted into the cover portion and the body portion is "a". and the distance between the upper end of the straight tube member 84a and the furthermost part of the passage in the body portion is "b", these are designed so that b>a.

Further, a member which is smaller than the outer diameter of the straight tube member 84a is disposed in the opening part at the lower end of the body portion so that the length of the straight tube member 84a which is inserted into the opening part does not exceed the length "a" and that the straight tube member 84a is equally inserted at the upper and the lower end portions thereof.

As shown in FIGS. 10 and 11, the artificial light irradiation members 89 are disposed at the front and the back of the photocatalyst reaction portion 86, and include the two ultraviolet light sources 88 of straight tube shape, which are disposed at opposite sides of the photocatalyst reaction portion 86, and a holder 88a of a rectangular plate shape can be used for holding the ultraviolet light sources 88.

The ultraviolet light sources 88 are disposed vertically so that the ultraviolet light is uniformly irradiated onto the entire photocatalyst reaction portion 86.

An excimer lamp or a black light commonly used may be employed as the ultraviolet light sources 88.

The reflection board member 90 is disposed so as to surround the photocatalyst reaction portion 86 and the artificial light irradiation members 89. The reaction board member 90 is designed to reflect the light irradiated from the ultraviolet light source 88 in a highly efficient manner in order to irradiate the photocatalyst granules 85. Also, it is structured so that the light does not leak from the inside to the outside. As shown in FIG. 11, it is preferable that the reflection board member 90 be disposed to have a hexagonal cross section in a horizontal direction.

Examples of materials which may be used for the reflection board member 90 include aluminum, stainless steel, and copper, and the reflection board member 90 should have a smooth surface and an excellent heat radiation properties.

The decomposition product gas, which has been decomposed in the photooxidation decomposition processing unit 65, passes through the outlet portion 84c, the decomposition product gas discharge port 91b, and the decomposition product gas supply line 66 to reach the after-treatment unit 67.

Also, a liquid level sensor 97 for detecting the level of liquid in the aeration vessel 70, which is located at an intermediate portion of the aeration vessel 70, may be disposed at the outside surface of the photooxidation decomposition processing unit 65.

Moreover, the control unit 68 is disposed adjacent to the photocatalyst reaction portion 86, and may be covered by a cover member 99 to prevent it from being affected by the heat generated by the ultraviolet light sources 88.

The control unit 68 includes an earth leakage breaker 100, a sequencer 101, an outlet 102 for a pump, an inverter circuit 103 for an ultraviolet light source, and a cover member 99. The control unit 68 can control the entire waste liquid treatment device including the solvent separation unit 61, the vaporization treatment unit 63, the photooxidation decomposition processing unit 65, and the after-treatment unit 67, and the automatic operation of the device may be carried out by the sequencer 101.

Also, a treated drainage discharge unit, which includes the intermediate tube 79 connected to the lower portion of the aeration vessel 70, the electromagnetic valve 83, a waste liquid tube 104, and a treated drainage storage vessel, is provided so that treated drainage is discharged, due to its weight, to the drainage storage vessel when the electromagnetic valve 83 is opened. The intermediate tube 79 and the branched joint 79a to which the compressed air supply tube 82 is connected in order to supply air from the air pump 81 for the aeration process, are provided at the IN side of the electromagnetic valve 83. The intermediate tube 79 may be used for discharging treated drainage as well as for supplying air.

The treated drainage storage vessel always maintains a fill-up state so that waste liquid overflowed from the vessel is naturally discharged. Also, it is designed so that the concentration of the treated drainage may be confirmed at any time.

As shown in FIG. 7, the decomposition product gas supply line 66 is connected to the after-treatment unit 67.

The after-treatment unit 67 may be a treatment vessel having a decomposition product gas inlet portion and an exhaust gas outlet portion.

Also, it is preferable that the decomposition product gas supply line 66, the treatment vessel, and the decomposition product gas inlet portion be formed by a polymeric material such as a fluororesin, a polyethylene type resin, or a nylon type resin, having excellent corrosion resistance properties and chemical resistance properties.

The treatment vessel may be a substantially square pole vessel having a bottom surface area of about 100–300 cm$^2$, a height of about 100–500 cm, and a volume of about 10–30 L. The treatment vessel may be made of a polyethylene type resin, or a fluororesin, having an excellent corrosion resistance properties. Also, it is possible to use a container having inner surfaces coated by such resins, as the treatment vessel.

As mentioned above, agents for absorbing, adsorbing, and neutralizing decomposition product gases, which are supplied from the decomposition product gas inlet portion, are provided in the treatment vessel.

Also, it is preferable that an air diffusing member comprising an air diffusing tube or an air diffusing plate be provided inside of the treatment vessel at the decomposition product gas inlet portion in order to increase the after-treatment efficiency.

The solvent separation unit 61, the vaporization treatment unit 63, the photooxidation decomposition processing unit 65, and the after-treatment unit 67, which are structural components of the waste liquid treatment device, are removable, that whenever a problem occurs, only the component experiencing the problem may be exchanged. The waste liquid treatment device according to an embodiment of the invention has a width of about 5–15 cm, a depth of about 12–25 cm, and a height of about 40–90 cm. The bottom portion of the waste liquid treatment device is formed by a base portion 105.

In the waste liquid treatment device having the above-mentioned structure, a chlorine containing organic solvent which is finely dispersed in a waste liquid is separated by the solvent separation unit 61, and chlorine containing organic solvent in the waste liquid is vaporized by the vaporization treatment unit 63. The vaporized chlorine containing organic solvent gas is photooxidized and decomposed by the photooxidation decomposition processing unit 65, and the resultant decomposition product gas including chlorine gas is converted to harmless salts by the after-treatment unit 67. Accordingly, it becomes possible to decrease the amount of chlorine containing organic compounds present in treated drainage and exhaust gas, and the output of chlorine gas, which is a secondary by-product, to be within the range of emission standard values defined by the Water Pollution Control Law. Therefore, the present invention may contribute to the prevention of environmental pollution.

Also, since the device is constructed so that chlorine containing organic compounds contained in waste liquid supplied from, for example, a dry cleaning device, are adsorbed by the solvent separation unit 61, vaporized in the vaporization treatment unit 63, and photooxidized and decomposed in the photooxidation decomposition processing unit 65, it becomes possible, compared to the case wherein waste liquid is directly subjected to a photooxidation decomposition process, to increase the photooxidation decomposition treatment efficiency, and hence, the time and cost required to execute the process may be reduced.

Moreover, since the separation member 72 which forms the solvent separation unit 61 is mainly formed by a porous material made of, for instance, a sintered compact of a water-repellent and/or lipophilic resin, it becomes possible to efficiently adsorb a chlorine containing organic solvent which is finely dispersed in waste liquid. This has been difficult to achieve by using the conventional techniques.

Further, according to an embodiment of the present invention, the chlorine containing organic solvent which has been adsorbed by the separation member 72 is vaporized by the gas generated by the aeration process, and the resulting gas can be discharged to the vaporized gas supply line 64 using the pressure inside the aeration vessel 70. Accordingly, energy may be efficiently used according to the present invention. In the above-mentioned manner, the separation member 72 is regenerated without being saturated by the chlorine containing organic solvent, and it is possible to repeatedly carry out the solvent separation process.

In addition, since an air diffusion pump which may be used for a domestic water tank may be utilized as a source for supplying compressed air used for an aeration process, it becomes possible to decrease the cost required for the device.

Also, since an air diffusing member 80 comprising an air diffusing tube or an air diffusing plate may be provided at the compressed air inlet portion 78 at the inside of the aeration vessel 70, it becomes possible to decrease the size of the bubbles generated in waste liquid during an aeration process. Accordingly, the contact time and area of the bubbles with the waste liquid may be increased, and hence, excellent aeration efficiency can be achieved.

Moreover, since a container which is long in the vertical direction is used as the aeration vessel 70, it becomes possible to increase the contact time and area of the air with the waste liquid, and hence, the aeration efficiency may be improved and the time required for the process may be shortened.

Further, because the inside surfaces of the passage through which the vaporized gas and/or the decomposition product gas flows are coated by a polymeric material, such as a fluororesin or a polyethylene type resin, having excellent corrosion resistance properties, and chemical resistance properties, or made of such a polymeric material, they are not significantly corroded by the chlorine gas, etc.

In addition, by using the straight tube member 84a having an inner diameter of about 5–30 mm, and a length of about 200–800 mm in the photooxidation decomposition processing unit 65, it becomes possible to uniformly irradiate the entire photocatalyst reaction portion 86 including the center portion thereof by the ultraviolet light from the ultraviolet light sources 88. Accordingly, the waste liquid treatment device of the invention has an excellent photooxidation-decomposition treatment efficiency.

Also, since photocatalyst granules 85 having a particles size of about 1–20 mm are used to increase the specific surface area thereof, it becomes possible to increase the efficiency the photocatalyst granules 85 to make contact with the vaporized gas, and the light receiving efficiency of the photocatalyst granules 85. Accordingly, the waste liquid treatment device of the invention has an excellent photooxidation-decomposition treatment efficiency.

Moreover, since a mixture of an inorganic powder, which adsorbs the chlorine containing organic gases or chlorine gases, and photocatalyst particles is used as the photocatalyst granules 85, the chlorine containing organic gas, etc. is subjected to a photooxidation-decomposition process while adsorbed onto the photocatalyst granules 85. Accordingly, the waste liquid treatment device of the invention has an excellent photooxidation-decomposition treatment efficiency, and undecomposed chlorine containing organic materials are not discharged to the outside of the photooxidation decomposition processing unit 65.

Further, since the straight tube members 84a and the ultraviolet light sources 88 are vertically disposed, the photooxidation decomposition processing unit 65 has a vertically elongated structure. Accordingly, it becomes possible to reduce the area for installing the device of the invention.

Figure 12:
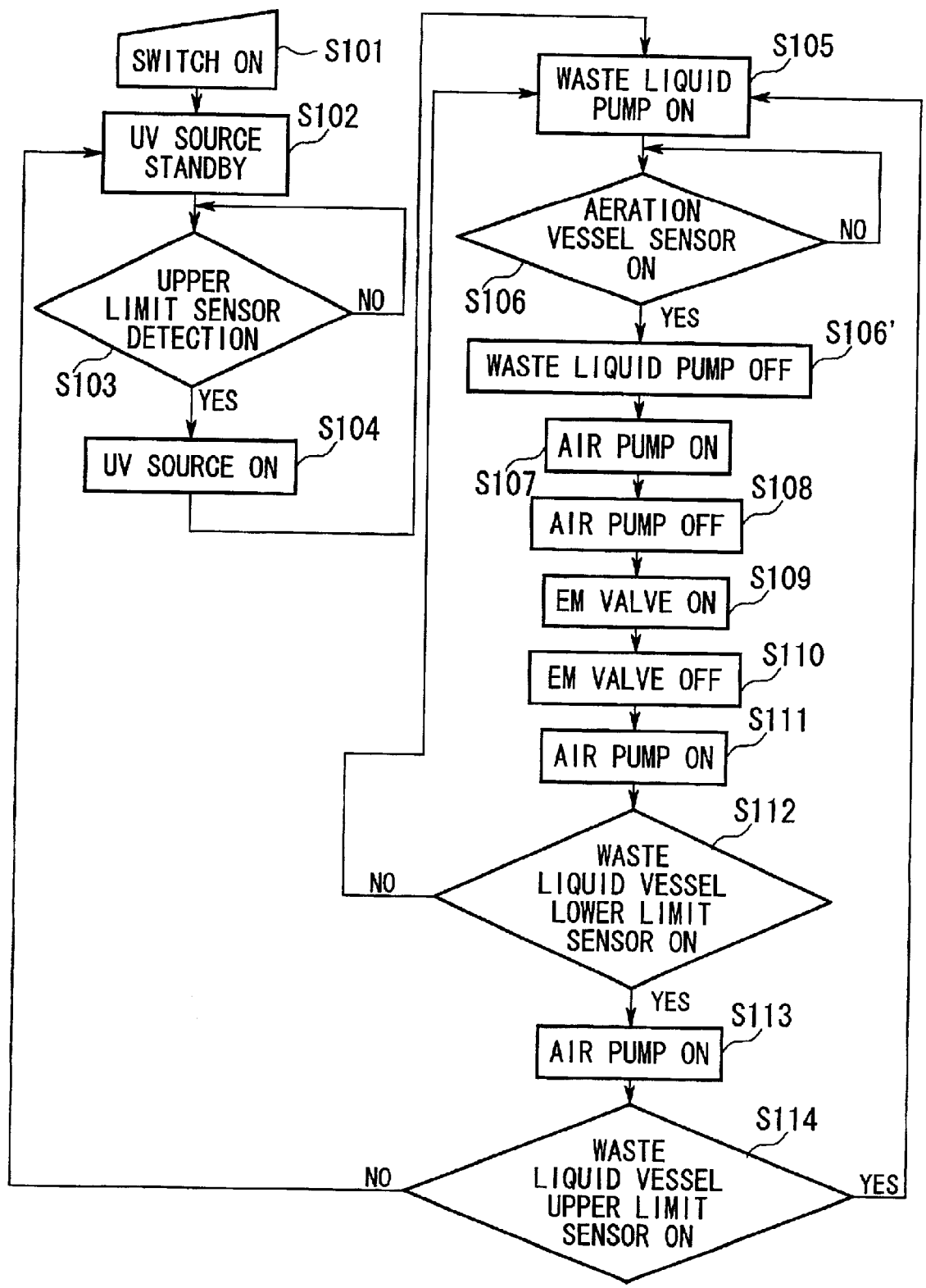
FIG. 12 is a flowchart for explaining the operation of the waste liquid treatment device according to an embodiment of the invention.

Next, operation of the waste liquid treatment device according to another embodiment of the invention will be described with reference to FIG. 12.

When power is supplied to the waste liquid treatment device of an embodiment of the invention (S101), the device is started and the following series of operations are performed under the control of the sequencer 101 in the control unit 68.

First, the ultraviolet light sources 88 enter a standby mode (S102).

Then, waste liquid including a chlorine containing organic solvent is supplied to the waste liquid supply unit from a water separator of a dry cleaning device. When the supplied waste liquid reaches the upper limit and is detected by an upper limit liquid level sensor disposed in a waste liquid vessel (S103), the ultraviolet light sources 88 are turned on (S104), a waste liquid supply pump is actuated (S105), and the waste liquid is supplied to the solvent separation unit 61 which is disposed at the upper portion of the aeration vessel 70. After this, part of the chlorine containing organic solvent which is dispersed in the waste liquid in a fine particle state, are adsorbed by the separation member 72 of the solvent separation unit 61, and the waste liquid in which the rest of the chlorine containing organic solvent is dissolved, is supplied to the aeration treatment unit which is disposed at the lower portion of the aeration vessel 70.

Then, when the level of the waste liquid in the aeration treatment unit reaches the position of the liquid level sensor 70 disposed at the outside surface of the aeration vessel 70 (S106), the supply of the waste liquid is stopped (S106'), and the air pump 81 is actuated (S107) to start the aeration process for the waste liquid.

At that time, as the chlorine containing organic solvent present in the waste liquid is vaporized, the chlorine containing organic solvent adsorbed by the separation member 72 is also vaporized by the air including the vaporized chlorine containing organic solvent and is supplied to the photooxidation decomposition processing unit 65.

After that the chlorine containing organic gas which is supplied to the photooxidation decomposition processing unit 65, is decomposed by the photocatalyst granules 85, which are excited by the ultraviolet light, in the photocatalyst reaction portion 86 and converted into water, carbon dioxide, and chlorine gas, and supplied to the after-treatment unit 67.

In the after-treatment unit 67, a neutralization-reduction process is carried out by using an alkali ion solution containing sodium carbonate, sodium bicarbonate, sodium thiosulfate, etc., to convert the chlorine containing organic gas and the chlorine gas into chlorine ions which are dissolved in the solution.

Next, when the aeration process has been carried out for sufficient time to reduce the concentration of the chlorine containing organic solvent in the waste liquid to a level sufficiently below the emission standard value (about 20 minutes), the air pump 81 is stopped (S108), and the aeration process is terminated. After that, the electromagnetic valve 83 is opened (S109), and the drainage in the aeration vessel 70 is discharged into the treated drainage storage vessel of the treated drainage discharge unit which is separately provided.

When the discharge of drainage is terminated, the electromagnetic valve 83 is closed (S110), and the air pump 81 is actuated for five minutes (S111) to supply air to the aeration vessel 70 and regenerate the separation member 72.

If the level of the waste liquid in the waste liquid vessel does not reach the position of the lower limit liquid level sensor when the regeneration of the separation member 72 is completed (S112), the cycle of S105–S111 explained above is repeated. On the other hand, if the level of the waste liquid in the waste liquid vessel reaches the position of the lower limit liquid level sensor when the regeneration of the separation member 72 is completed (S112), the air pump 81 is actuated for one hour (S113) to supply air into the aeration vessel 70 and completely regenerate the separation member 72.

After the separation member is regenerated, if the level of the waste liquid which is supplied from the water separator of the dry cleaning device, in the waste liquid vessel again reaches the position of the upper limit liquid level sensor disposed in the waste liquid vessel (S114), the cycle of S105–S111 explained above is repeated. On the other hand, if the level of the waste liquid in the waste liquid vessel does not reach the position of the upper limit liquid level sensor (S114), the ultraviolet light sources 88 are turned off and enter the standby mode until the level of the waste liquid in the waste liquid vessel reaches the position of the upper limit liquid level sensor.

As explained above, since the waste liquid treatment processes are automated and the standby mode is introduced, it becomes possible to save electric power, to extend the life of the ultraviolet light sources 88, and to minimize the cost treating the waste liquid.

Also, in a cleaning or dry cleaning device using the above-mentioned waste liquid treatment device, since the series of processes from the cleaning process to the waste liquid treatment process may be automated, it becomes possible to decrease the cost of the series of processes. Moreover, in the above device, the efficiency in the series of processes for decomposing the chlorine containing organic solvent in the waste liquid is excellent, and also the discharge of secondary by-products may be prevented.

As described above, according to the method for treating waste liquid of an embodiment of the invention, since the chlorine containing organic solvent dispersed in the waste liquid in a fine particle state may be readily adsorbed and removed in the solvent separation process, it becomes possible to reduce the time and cost of the waste liquid treatment process. Accordingly, the amount of chlorine containing organic compounds in drainage or in exhaust gas, or the amount of chlorine gas which is a by-product, may be readily reduced to within the emission standard values.

Also, according to the method for treating waste liquid of an embodiment of the invention, since the solvent separation member is regenerated by air including a chlorine containing organic solvent, which has been vaporized in the vaporization treatment process, or by fresh air supplied from outside, the porous materials which form the separation member may maintain their ability to treat the waste without being saturated by the chlorine containing organic solvent. Accordingly, it becomes possible to decrease the cost of the process.

Moreover, in the waste liquid treatment device according to an embodiment of the invention, since the control unit is provided, it becomes possible to automatically carry out the series of waste liquid treatment processes. Accordingly, if the waste liquid treatment device is used for a washing device, such as a cleaning device, it becomes possible to automatically start or stop the device depending on the operational situation. Therefore, it is possible to not only extend the life of the ultraviolet light sources but also to reduce the cost of the operation without wasting power.

Further, in the waste liquid treatment device according to an embodiment of the invention, since the device is downsized and a low-cost domestic pump or air-pump is utilized, the manufacturing cost of the device may be reduced. In addition, the running cost of the device may also be reduced and the maintenance of the device can be easily performed.

Also, as described above, since the solvent separators according to the embodiments of the invention are capable of continuously carrying out the introduction of waste liquid, the separation, vaporization, and discharge of the chlorine containing organic solvent, the discharge of water, and the regeneration of the porous material which constitutes the separation unit, it becomes possible to efficiently carry out the separation of the chlorine containing organic solvent.

Moreover, according to the solvent separators of the embodiments of the present invention, since the chlorine containing organic solvent is adsorbed by the porous material by utilizing the differences in wetting properties between the chlorine containing organic solvent and water, it becomes possible to adsorb and separate the chlorine containing organic solvent which is dispersed in waste liquid in a fine particle state. Moreover, the chlorine containing organic solvent, once adsorbed by the separation member, does not return to the waste liquid. Accordingly, the separation of the chlorine containing organic solvent from the water is carried out substantially completely, and water discharged from the solvent separator does not contain the chlorine containing organic solvents.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the invention is limited and defined only by the following claims and equivalents thereto.

What is claimed is:

1. A solvent separator, comprising:
   an introduction member which introduces a mixture comprising a chlorine containing organic solvent and water;
   a separation unit comprising a separation member made of a water-repellant and/or lipophilic porous material, which carries out the separation of said mixture, wherein said separation member has the form of a film, plate, tube, container, or granules;
   a water drainage member through which water separated by said separation unit is discharged; and
   a solvent drainage member through which the chlorine containing organic solvent separated by said separation unit is discharged.

2. A solvent separator, comprising:
   an introduction member which introduces a mixture comprising a chlorine containing organic solvent and water;
   a separation unit comprising a separation member made of a water-repellant and/or lipophilic porous material, which carries out the separation of said mixture;
   a water drainage member through which water separated by said separation unit is discharged;
   a supply member which supplies air to said separation unit to vaporize said chlorine containing organic solvent; and
   an exhaust member through which the air supplied by said supply member and/or vaporized chlorine containing organic solvent is discharged.

3. A solvent separator according to claim 2, wherein said separation member has the form of a film, plate, tube, container, or granule.

4. A dry cleaning device comprising a solvent separator comprising:
   an introduction member which introduces a mixture comprising a chlorine containing organic solvent and water;
   a separation unit comprising a separation member made of a water-repellant and/or lipophilic porous material, which carries out the separation of said mixture;
   a water drainage member through which water separated by said separation unit is discharged; and
   a solvent drainage member through which the chlorine containing organic solvent separated by said separation unit is discharged.

5. A method for treating waste liquid comprising the steps of:
   carrying out a solvent separation process in which a chlorine containing organic solvent present in waste liquid is separated;
   carrying out a vaporization treatment process after said solvent separation process whereby chlorine containing organic solvent remaining in the waste liquid is vaporized;
   carrying out a photooxidation-decomposition process in which gas vaporized from the waste liquid is subjected to a photooxidation-decomposition treatment; and
   carrying out an after-treatment process in which decomposition product gas produced by the photooxidation-decomposition treatment is converted into a harmless substrate.

6. A method for treating waste liquid according to claim 5, wherein said decomposition product gas is adsorbed, absorbed, and neutralized in said after-treatment process to be converted into a harmless substance.

7. A method for treating waste liquid according to claim 5, wherein said solvent separation process is performed prior to said vaporization treatment process.

8. A method for treating waste liquid according to claim 5, wherein
   the waste liquid is brought into contact with a separation member made of a water-repellant and/or lipophilic porous member so that the chlorine containing organic solvent present in the waste liquid is adsorbed by the separation member in said solvent separation process.

9. A method for treating waste liquid according to claim 8, wherein said vaporization treatment process includes a step of vaporizing the chlorine containing organic solvent adsorbed by said separation member.

10. A method for treating waste liquid according to claim 5, wherein said vaporization treatment process is performed by using an aeration method.

11. A waste liquid treatment device, comprising:
    a solvent separation unit which separates chlorine containing organic solvent present in waste liquid;
    a vaporization treatment unit which vaporizes a part of the chlorine containing organic solvent which was not separated by said solvent separation unit and remains in the waste liquid;
    a photooxidation decomposition processing unit which photooxidizes and decomposes gas vaporized from the waste liquid by said vaporization treatment unit;
    an after-treatment unit which converts decomposition product gas produced by said photooxidation-decomposition processing unit into a harmless substrate; and
    a control unit including a sequencer which controls an operation of said solvent separation unit, said vaporization treatment unit, said photooxidation decomposition processing unit, and said after-treatment unit.

12. A waste liquid treatment device according to claim 11, wherein said after-treatment unit adsorbs, absorbs, and neutralizes the decomposition product gas in order to convert the decomposition product gas into a harmless substrate.

13. A cleaning device comprising the waste liquid treatment device according to claim 11.

14. A dry waning device comprising the waste liquid treatment device according to claim 11.

* * * * *